US012732992B2

United States Patent

(12) United States Patent
Liu et al.

(10) Patent No.: US 12,732,992 B2
(45) Date of Patent: Sep. 8, 2026

(54) DATA TRANSMISSION METHOD AND APPARATUS FOR PUSCH

(71) Applicant: Huawei Technologies Co., Ltd., Shenzhen (CN)

(72) Inventors: Yun Liu, Shenzhen (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 283 days.

(21) Appl. No.: 18/255,650

(22) PCT Filed: Dec. 2, 2021

(86) PCT No.: PCT/CN2021/135189
§ 371 (c)(1),
(2) Date: Jun. 2, 2023

(87) PCT Pub. No.: WO2022/117058
PCT Pub. Date: Jun. 9, 2022

(65) Prior Publication Data

US 2024/0057074 A1 Feb. 15, 2024

(30) Foreign Application Priority Data

Dec. 3, 2020 (CN) ......................... 202011410208.2
Jan. 15, 2021 (CN) ......................... 202110057975.8

(51) Int. Cl.
*H04W 72/12* (2023.01)
*H04W 72/1268* (2023.01)
*H04W 72/232* (2023.01)

(52) U.S. Cl.
CPC ..... *H04W 72/1268* (2013.01); *H04W 72/232* (2023.01)

(58) Field of Classification Search
CPC ............... H04W 72/231; H04W 72/23; H04W 72/0446; H04W 72/232; H04W 72/1268; H04L 1/189; H04L 1/1819; H04L 1/181
See application file for complete search history.

(56) References Cited

U.S. PATENT DOCUMENTS

2013/0022083 A1* 1/2013 Vasseur ............... H04L 12/4035 375/132
2016/0285932 A1* 9/2016 Thyamagundalu .......................... H04L 12/4633

(Continued)

FOREIGN PATENT DOCUMENTS

CN 109792746 A 5/2019
CN 111585722 A 8/2020

(Continued)

OTHER PUBLICATIONS

3GPP TS 38.214 V16.3.0 (Sep. 2020), 3rd Generation Partnership Project;Technical Specification Group Radio Access Network; NR; Physical layer procedures for data (Release 16), 166 pages.

(Continued)

*Primary Examiner* — Wei Zhao
(74) *Attorney, Agent, or Firm* — Slater Matsil, LLP

(57) ABSTRACT

The method includes: determine N1 slots based on a physical uplink shared channel, PUSCH resource, wherein the N1 slots are used to send a first redundancy version, RV of a PUSCH, and N1 is an integer greater than 1; send the $1^{st}$ bit in the first RV on a second slot if the last bit in the first RV is sent on the last bit of a first slot, wherein the first slot is the $(n1)^{th}$ slot in the N1 slots, the second slot is the $(n1+1)^{th}$ slot in the N1 slots, n1=1, 2, . . . , or N1−1; and continuously send bits in the first RV if the last bit sent on the first slot is not the last bit in the first RV, wherein the last bit sent on the first slot and the $1^{st}$ bit sent on the second slot are two adjacent bits in the first RV.

24 Claims, 15 Drawing Sheets

(56) References Cited

U.S. PATENT DOCUMENTS

| | | | | |
|---|---|---|---|---|
| 2020/0162208 | A1 | 5/2020 | Moon et al. | |
| 2020/0367208 | A1 | 11/2020 | Khoshnevisan et al. | |
| 2023/0328723 | A1* | 10/2023 | Dai | H04L 1/08 370/329 |

FOREIGN PATENT DOCUMENTS

| | | | |
|---|---|---|---|
| CN | 111769899 | A | 10/2020 |
| CN | 111770577 | A | 10/2020 |
| CN | 111770588 | A | 10/2020 |
| WO | 2020145773 | A1 | 7/2020 |
| WO | 2020222299 | A1 | 11/2020 |
| WO | 2020223979 | A1 | 11/2020 |

OTHER PUBLICATIONS

3GPP TS 38.331 V16.2.0 (Sep. 2020), 3rd Generation Partnership Project;Technical Specification Group Radio Access Network; NR; Radio Resource Control (RRC) protocol specification (Release 16), 926 pages.

3GPP TS 38.212 V16.3.0 (Sep. 2020), 3rd Generation Partnership Project;Technical Specification Group Radio Access Network; NR; Multiplexing and channel coding (Release 16), 152 pages.

3GPP TSG-RAN WG1 Meeting AH-1901 R1-1900905, "Multi-TRP Enhancements", Qualcomm Incorporated, Jan. 21-25, 2019, total 26 pages.

3GPP TSG RAN WG1 #99 R1-1912398, "PUSCH enhancements for NR URLLC", LG Electronics, Reno, USA, Nov. 18-22, 2019, total 13 pages.

Nokia, Nokia Shanghai Bell:"Maintenance of PUSCH enhancements for Rel-16 NR URLLC",3GPP TSG RAN WG1 Meeting #100, e-Meeting, Feb. 24-Mar. 6, 2020, R1-2000406, total 13 pages.

Huawei, HiSilicon:"Corrections on PUSCH enhancement", 3GPP TSG RAN WG1 Meeting #100bis-e, E-meeting, Apr. 20-Apr. 30, 2020, R1-2001549, total 10 pages.

* cited by examiner

FIG. 3
FIG. 4
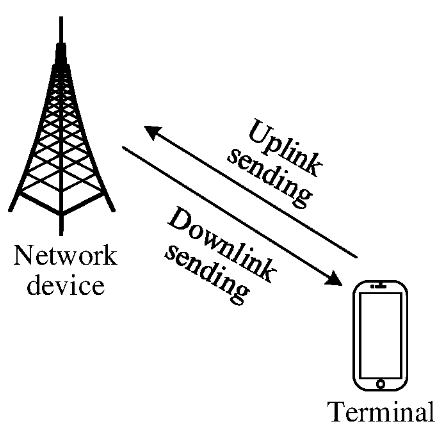
FIG. 5

Processor 1901

Memory 1902

Transceiver 1903

Input interface and/or output interface

Logic circuit

Processor 1901

Memory 1902

DATA TRANSMISSION METHOD AND APPARATUS FOR PUSCH

CROSS-REFERENCE TO RELATED APPLICATIONS

This application is a national stage of International Application No. PCT/CN2021/135189, filed Dec. 2, 2021, which claims priority to Chinese Patent Application No. 202110057975.8, filed on Jan. 15, 2021 and Chinese Patent Application No. 202011410208.2, filed on Dec. 3, 2020. All the aforementioned applications are hereby incorporated by reference in their entireties.

TECHNICAL FIELD

This application relates to the field of communication technologies, and in particular, to a data transmission method and apparatus.

BACKGROUND

Currently, before a terminal repeatedly sends a physical uplink shared channel (physical uplink shared channel, PUSCH), a network device may configure a start symbol S, a quantity L of symbols, and a number of repetitions, so that the terminal obtains a resource for repeatedly sending the PUSCH. It is assumed that a start slot in which the terminal sends the PUSCH is a slot n. In this case, starting from a start symbol S in the slot n, number of repetitions*L available symbols are all used to repeatedly send the PUSCH. For example, referring to FIG. 1, if S=8, L=14, number of repetitions=4, starting from a start symbol 8 in the slot n, L*4 available symbols are all used to repeatedly send the PUSCH. Every L available symbols starting from the start symbol 8 in the slot n are denoted as one nominal repetition (nominal repetition), and symbols that are in one nominal repetition and that are located in a same slot are denoted as one actual repetition (actual repetition). A redundancy version (redundancy version, RV) of the PUSCH is sent on each actual repetition. For a possible case of the RV sent on each actual repetition, refer to FIG. 1. According to the method, the PUSCH may be repeatedly sent by using all available symbols as much as possible. However, since resources of actual repetitions are relatively discrete, RVs of the PUSCH cannot be completely sent. Consequently, decoding performance of the network device is affected, and reliability of data transmission is reduced.

SUMMARY

Embodiments of this application provide a data transmission method and apparatus, to improve decoding performance of a network device and reliability of data transmission.

According to a first aspect, a data transmission method is provided. The method includes: receiving a slot format and a PUSCH parameter from a network device; determining a PUSCH resource based on the slot format and the PUSCH parameter; determining N1 resources based on the PUSCH resource; and continuously sending bits in a first RV on the N1 resources. The N1 resources are used to send a first RV of a PUSCH, the N1 resources are located in at least two slots, and N1 is an integer greater than 1. In the method according to the first aspect, discrete resources for sending a same RV are integrated, and the first RV is continuously sent on the integrated resource. Compared with the conventional technology in which RVs are sent from scratch on each resource, a terminal can send the complete first RV, which can resolve a problem that an RV is incompletely sent due to resource discreteness of the resources, and improve decoding performance of the network device and reliability of data transmission. If the first RV is RV0, a loss of decoding performance due to incomplete sending of RV0 (that is, missing transmission of a system bit) may be further reduced.

In a possible implementation, the continuously sending bits in a first RV includes: sending the $1^{st}$ bit in the first RV on a second resource if the last bit in the first RV is sent on a first resource, where the first resource is the $(n1)^{th}$ resource in the N1 resources, the second resource is the $(n1+1)^{th}$ resource in the N1 resources, and n1=1, 2, . . . , or N1−1. In this possible implementation, it can be ensured that the first RV is sent as completely as possible.

In a possible implementation, the sending the $1^{st}$ bit in the first RV is sent on a second resource includes: sending the $1^{st}$ bit in the first RV on the second resource when a quantity of REs in a remaining resource in the first resource is less than or equal to a first threshold. In this possible implementation, a start location of the first RV may be determined without wasting many resources.

In a possible implementation, the continuously sending bits in a first RV includes: sending the $1^{st}$ bit in the first RV on a second symbol in a first resource if the last bit in the first RV is sent on a first symbol in the first resource, where the first resource is the $(n2)^{th}$ resource in the N1 resources, the second symbol is a next symbol of the first symbol, and n2=1, 2, . . . , or N1. In this possible implementation, it can be ensured that the first RV is sent as completely as possible.

In a possible implementation, the sending the $1^{st}$ bit in the first RV on a second symbol in a first resource includes: sending the $1^{st}$ bit in the first RV on the second symbol when a quantity of REs in a remaining resource on the first symbol is less than or equal to a second threshold. In this possible implementation, a start location of the first RV may be determined without wasting many resources.

In a possible implementation, the continuously sending bits in a first RV includes: sending the $1^{st}$ bit in the first RV on a remaining resource on a first symbol in a first resource if the last bit in the first RV is sent on the first symbol in the first resource, where the first resource is the $(n3)^{th}$ resource in the N1 resources, and n3=1, 2, . . . , or N1. In this possible implementation, it can be ensured that the first RV is sent as completely as possible. In this possible implementation, a start location of the first RV may be determined without wasting many resources.

In a possible implementation, the continuously sending bits in a first RV further includes: If the last bit sent on a third resource is not the last bit in the first RV, the last bit sent on the third resource and the $1^{st}$ bit sent on a fourth resource are two adjacent bits in the first RV, the third resource is the $(n4)^{th}$ resource in the N1 resources, the fourth resource is the $(n4+1)^{th}$ resource in the N1 resources, and n4=1, 2, . . . , or N1−1. In this possible implementation, it can be ensured that the first RV is sent as completely as possible. In this possible implementation, the first RV does not to be sent from scratch on the fourth resource, so that all bits in the first RV are sent.

In a possible implementation, the continuously sending bits in a first RV on the N1 resources includes: continuously sending the bits in the first RV on the N1 resources if a quantity of symbols occupied by the PUSCH resource is greater than or equal to a third threshold or a number of repetitions indicated by the PUSCH parameter is greater than or equal to a fourth threshold. In this possible implementation, the method provided in this application may be used to send an RV when necessary, and the method provided in this application may not be used to send an RV when not necessary. This improves sending efficiency.

In a possible implementation, the third threshold is related to a quantity of symbols and a number of repetitions of the PUSCH, and the quantity of symbols and the number of repetitions are indicated by the PUSCH parameter. In this possible implementation, if the PUSCH resources are insufficient, it is difficult to obtain a gain of continuously sending the RV. Therefore, when the PUSCH resources are sufficient, the continuous sending of the RV is triggered, and the gain of continuously sending the RV may be obtained.

In a possible implementation, if two of the N1 resources that are consecutive in time domain have a same frequency domain resource, a DMRS in the PUSCH is not sent on a resource that is later in time domain in the two resources. In this possible implementation, more resources can be used to send data. This improves resource utilization.

In a possible implementation, the method further includes: determining N2 resources based on the PUSCH resource, where the N2 resources are used to send a second RV of the PUSCH, the N2 resources are located in at least two slots, and N2 is an integer greater than 1; and continuously sending bits in the second RV on the N2 resources. In this possible implementation, when the first RV is completely sent as much as possible, the second RV may also be completely sent as much as possible. This further improves decoding performance of the network device and reliability of data transmission.

According to a second aspect, a data transmission method is provided. The method includes: receiving a slot format and a PUSCH parameter from a network device; determining a PUSCH resource and a first value based on the slot format and the PUSCH parameter; determining X RVs of a PUSCH based on the first value; and sending at least one of the X RVs on the PUSCH resource, where X is an integer greater than 0. In the method according to the second aspect, more RVs (for example, more than four RVs) are introduced, a quantity of RVs is determined based on a quantity of resources or a number of repetitions in a PUSCH resource, and more RVs are sent on the resource, so that different resources carry different RVs as much as possible, a problem that a same RV is repeatedly sent on the resource due to a relatively small quantity of RVs is alleviated, integrity of system bit sending is improved as much as possible, and a loss of decoding performance caused by incomplete system bit sending due to discrete resources is reduced.

In a possible implementation, X is the same as the first value; or X is a value that is greater than the first value and closest to the first value or a value that is less than the first value and closest to the first value in a plurality of optional values, where the plurality of optional values are preset. In this possible implementation, a plurality of methods for determining X are provided, which can improve flexibility of implementing this application.

According to a third aspect, a data transmission method is provided. The method includes: determining a PUSCH resource based on a PUSCH parameter and a slot format, where the PUSCH resource includes M resources, and one of the M resources is used to carry an RV of a PUSCH; and sending first indication information to a terminal, so that a first RV of the PUSCH is sent on a first resource, where the first RV is an RV whose index is 0. The first indication information indicates an RV of the PUSCH that is sent on the $1^{st}$ resource in the M resources, and the first resource is a resource with a maximum quantity of symbols in the M resources, or the first resource is a resource with a maximum quantity of symbols in resources used to send a same RV in the M resources. In the method according to the third aspect, since RV0 includes a largest quantity of system bits, after scheduling, the terminal is enabled to send RV0 on a resource with a largest quantity of symbols, so that more system bits are received as much as possible. This improves decoding performance.

In a possible implementation, before the first indication information is sent to the terminal, the method further includes: determining that all k values of the first indication information enable the first RV of the PUSCH to be sent on the first resource, where k is an integer greater than 1; determining, based on the k values, that lengths of resources occupied by a second RV are respectively L1, L2, . . . , and Lk, where the second RV is an RV whose index is 1 or 3; and when the first indication information is a first value in the k values, sending the second RV on a second resource, and determining that the first value in the k values is a value of the first indication information, where the second resource is a resource occupied by the second RV and whose length is Lmax, and Lmax is a largest value in L1, L2, . . . , and Lk. In this possible implementation, since RV1 and RV3 include more system bits than RV2, when there are a plurality of resources with a maximum quantity of symbols, the terminal may further send RV1 or RV3 on the resource with a relatively large quantity of symbols as much as possible while ensuring that RV0 is sent on the resource with the maximum quantity of symbols, so that the network device further receives more system bits. This improves decoding performance.

According to a fourth aspect, a data transmission method is provided. The method includes: determining a PUSCH resource based on a slot format and a PUSCH parameter; determining N1 resources based on the PUSCH resource, where the N1 resources are used to continuously send a first RV of a PUSCH; and receiving bits in the first RV on the N1 resources, where the N1 resources are located in at least two slots, and N1 is an integer greater than 1.

In a possible implementation, the continuously sending a first RV of a PUSCH includes: sending the $1^{st}$ bit in the first RV on a second resource if the last bit in the first RV is sent on a first resource, where the first resource is the $(n1)^{th}$ resource in the N1 resources, the second resource is the $(n1+1)^{th}$ resource in the N1 resources, and n1=1, 2, . . . , or N1−1.

In a possible implementation, the sending the $1^{st}$ bit in the first RV on a second resource includes: sending the $1^{st}$ bit in the first RV on the second resource when a quantity of REs in a remaining resource in the first resource is less than or equal to a first threshold.

In a possible implementation, the continuously sending a first RV of a PUSCH includes: sending the $1^{st}$ bit in the first RV on a second symbol in a first resource if the last bit in the first RV is sent on a first symbol in the first resource, where the first resource is the $(n2)^{th}$ resource in the N1 resources, the second symbol is a next symbol of the first symbol, and n2=1, 2, . . . , or N1.

In a possible implementation, the sending the $1^{st}$ bit in the first RV on a second symbol in a first resource includes: sending the $1^{st}$ bit in the first RV on the second symbol when a quantity of REs in a remaining resource on the first symbol is less than or equal to a second threshold.

In a possible implementation, the continuously sending a first RV includes: sending the $1^{st}$ bit in the first RV on a remaining resource on a first symbol in a first resource if the last bit in the first RV is sent on the first symbol in the first resource, where the first resource is the $(n3)^{th}$ resource in the N1 resources, and n3=1, 2, . . . , or N1.

In a possible implementation, the continuously sending a first RV of a PUSCH further includes: If the last bit sent on a third resource is not the last bit in the first RV, the last bit sent on the third resource and the $1^{st}$ bit sent on a fourth resource are two adjacent bits in the first RV, the third resource is the $(n4)^{th}$ resource in the N1 resources, the fourth resource is the $(n4+1)^{th}$ resource in the N1 resources, and n4=1, 2, . . . , or N1−1.

In a possible implementation, the N1 resources are used to continuously send the first RV of the PUSCH if a quantity of symbols occupied by the PUSCH resource is greater than or equal to a third threshold or a number of repetitions indicated by the PUSCH parameter is greater than or equal to a fourth threshold.

In a possible implementation, the third threshold is related to a quantity of symbols and a number of repetitions of the PUSCH, and the quantity of symbols and the number of repetitions are indicated by the PUSCH parameter.

In a possible implementation, if two of the N1 resources that are consecutive in time domain have a same frequency domain resource, a DMRS in the PUSCH is not sent on a resource that is later in time domain in the two resources.

In a possible implementation, the method further includes: determining N2 resources based on the PUSCH resource, where the N2 resources are used to continuously send a second RV of the PUSCH, the N2 resources are located in at least two slots, and N2 is an integer greater than 1; and receiving bits in the second RV on the N2 resources.

According to a fifth aspect, a data transmission method is provided. The method includes: determining a PUSCH resource and a first value based on a slot format and a PUSCH parameter; determining X RVs of a PUSCH based on the first value; and receiving at least one of the X RVs on the PUSCH resource, where X is an integer greater than 0.

In a possible implementation, X is the same as the first value; or X is a value that is greater than the first value and closest to the first value or a value that is less than the first value and closest to the first value in a plurality of optional values, where the plurality of optional values are preset.

According to a sixth aspect, a data transmission apparatus is provided. The apparatus includes a communication unit and a processing unit. The communication unit is configured to receive a slot format and a PUSCH parameter from a network device. The processing unit is configured to determine a PUSCH resource based on the slot format and the PUSCH parameter. The processing unit is further configured to determine N1 resources based on the PUSCH resource, where the N1 resources are used to send a first RV of a PUSCH, the N1 resources are located in at least two slots, and N1 is an integer greater than 1. The communication unit is further configured to continuously send bits in the first RV on the N1 resources.

In a possible implementation, the continuously sending bits in a first RV includes: sending the $1^{st}$ bit in the first RV on a second resource if the last bit in the first RV is sent on a first resource, where the first resource is the $(n1)^{th}$ resource in the N1 resources, the second resource is the $(n1+1)^{th}$ resource in the N1 resources, and n1=1, 2, . . . , or N1−1.

In a possible implementation, the sending the $1^{st}$ bit in the first RV on a second resource includes: sending the $1^{st}$ bit in the first RV on the second resource when a quantity of REs in a remaining resource in the first resource is less than or equal to a first threshold.

In a possible implementation, the continuously sending bits in a first RV includes: sending the $1^{st}$ bit in the first RV on a second symbol in a first resource if the last bit in the first RV is sent on a first symbol in the first resource, where the first resource is the $(n2)^{th}$ resource in the N1 resources, the second symbol is a next symbol of the first symbol, and n2=1, 2, . . . , or N1.

In a possible implementation, the sending the $1^{st}$ bit in the first RV on a second symbol in a first resource includes: sending the $1^{st}$ bit in the first RV on the second symbol when a quantity of REs in a remaining resource on the first symbol is less than or equal to a second threshold.

In a possible implementation, the continuously sending bits in a first RV includes: sending the $1^{st}$ bit in the first RV on a remaining resource on a first symbol in a first resource if the last bit in the first RV is sent on the first symbol in the first resource, where the first resource is the $(n3)^{th}$ resource in the N1 resources, and n3=1, 2, . . . , or N1.

In a possible implementation, the continuously sending bits in a first RV further includes: If the last bit sent on a third resource is not the last bit in the first RV, the last bit sent on the third resource and the $1^{st}$ bit sent on a fourth resource are two adjacent bits in the first RV, the third resource is the $(n4)^{th}$ resource in the N1 resources, the fourth resource is the $(n4+1)^{th}$ resource in the N1 resources, and n4=1, 2, . . . , or N1−1.

In a possible implementation, the communication unit is specifically configured to continuously send the bits in the first RV on the N1 resources if a quantity of symbols occupied by the PUSCH resource is greater than or equal to a third threshold or a number of repetitions indicated by the PUSCH parameter is greater than or equal to a fourth threshold.

In a possible implementation, the third threshold is related to a quantity of symbols and a number of repetitions of the PUSCH, and the quantity of symbols and the number of repetitions are indicated by the PUSCH parameter.

In a possible implementation, if two of the N1 resources that are consecutive in time domain have a same frequency domain resource, a DMRS in the PUSCH is not sent on a resource that is later in time domain in the two resources.

In a possible implementation, the processing unit is further configured to determine N2 resources based on the PUSCH resource, where the N2 resources are used to send a second RV of the PUSCH, the N2 resources are located in at least two slots, and N2 is an integer greater than 1; and the communication unit is further configured to continuously send bits in the second RV on the N2 resources.

According to a seventh aspect, a data transmission apparatus is provided. The apparatus includes a communication unit and a processing unit. The communication unit is configured to receive a slot format and a PUSCH parameter from a network device. The processing unit is configured to determine a PUSCH resource and a first value based on the slot format and the PUSCH parameter. The processing unit is further configured to determine X RVs of a PUSCH based on the first value, where X is an integer greater than 0. The communication unit is further configured to send at least one of the X RVs on the PUSCH resource.

In a possible implementation, X is the same as the first value; or X is a value that is greater than the first value and closest to the first value or a value that is less than the first value and closest to the first value in a plurality of optional values, where the plurality of optional values are preset.

According to an eighth aspect, a data transmission apparatus is provided. The apparatus includes a communication unit and a processing unit. The processing unit is configured to determine a PUSCH resource based on a PUSCH parameter and a slot format, where the PUSCH resource includes M resources, and one of the M resources is used to carry an RV of a PUSCH. The communication unit is configured to send first indication information to a terminal, so that a first RV of the PUSCH is sent on a first resource, and the first RV is an RV whose index is 0. The first indication information indicates an RV of the PUSCH that is sent on the $1^{st}$ resource in the M resources, and the first resource is a resource with a maximum quantity of symbols in the M resources, or the first resource is a resource with a maximum quantity of symbols in resources used to send a same RV in the M resources.

In a possible implementation, the processing unit is further configured to: determine that all k values of the first indication information enable the first RV of the PUSCH to be sent on the first resource, where k is an integer greater than 1; determine, based on the k values, that lengths of resources occupied by a second RV are respectively L1, L2, . . . , and Lk, where the second RV is an RV whose index is 1 or 3; and when the first indication information is a first value in the k values, send the second RV on a second resource, and determine that the first value in the k values is a value of the first indication information, where the second resource is a resource occupied by the second RV and whose length is Lmax, and Lmax is a largest value in L1, L2, . . . , and Lk.

According to a ninth aspect, a data transmission apparatus is provided. The apparatus includes a communication unit and a processing unit. The processing unit is configured to determine a PUSCH resource based on the slot format and the PUSCH parameter. The processing unit is further configured to determine N1 resources based on the PUSCH resource, where the N1 resources are used to continuously send a first RV of a PUSCH, the N1 resources are located in at least two slots, and N1 is an integer greater than 1. The communication unit is configured to receive bits in the first RV on the N1 resources.

In a possible implementation, the continuously sending a first RV of a PUSCH includes: sending the $1^{st}$ bit in the first RV on a second resource if the last bit in the first RV is sent on a first resource, where the first resource is the $(n1)^{th}$ resource in the N1 resources, the second resource is the $(n1+1)^{th}$ resource in the N1 resources, and n1=1, 2, . . . , or N1−1.

In a possible implementation, the sending the $1^{st}$ bit in the first RV on a second resource includes: sending the $1^{st}$ bit in the first RV on the second resource when a quantity of REs in a remaining resource in the first resource is less than or equal to a first threshold.

In a possible implementation, the continuously sending a first RV of a PUSCH includes: sending the $1^{st}$ bit in the first RV on a second symbol in a first resource if the last bit in the first RV is sent on a first symbol in the first resource, where the first resource is the $(n2)^{th}$ resource in the N1 resources, the second symbol is a next symbol of the first symbol, and n2=1, 2, . . . , or N1.

In a possible implementation, the continuously sending the $1^{st}$ bit in the first RV on a second symbol in a first resource includes: sending the $1^{st}$ bit in the first RV on the second symbol when a quantity of REs in a remaining resource on the first symbol is less than or equal to a second threshold.

In a possible implementation, the continuously sending a first RV of a PUSCH includes: sending the $1^{st}$ bit in the first RV on a remaining resource on a first symbol in a first resource if the last bit in the first RV is sent on the first symbol in the first resource, where the first resource is the $(n3)^{th}$ resource in the N1 resources, and n3=1, 2, . . . , or N1.

In a possible implementation, the continuously sending a first RV of a PUSCH further includes: If the last bit sent on a third resource is not the last bit in the first RV, the last bit sent on the third resource and the $1^{st}$ bit sent on a fourth resource are two adjacent bits in the first RV, the third resource is the $(n4)^{th}$ resource in the N1 resources, the fourth resource is the $(n4+1)^{th}$ resource in the N1 resources, and n4=1, 2, . . . , or N1−1.

In a possible implementation, the N1 resources are used to continuously send the first RV of the PUSCH if a quantity of symbols occupied by the PUSCH resource is greater than or equal to a third threshold or a number of repetitions indicated by the PUSCH parameter is greater than or equal to a fourth threshold.

In a possible implementation, the third threshold is related to a quantity of symbols and a number of repetitions of the PUSCH, and the quantity of symbols and the number of repetitions are indicated by the PUSCH parameter.

In a possible implementation, if two of the N1 resources that are consecutive in time domain have a same frequency domain resource, a DMRS in the PUSCH is not sent on a resource that is later in time domain in the two resources.

In a possible implementation, the processing unit is further configured to determine N2 resources based on the PUSCH resource, where the N2 resources are used to continuously send a second RV of the PUSCH, the N2 resources are located in at least two slots, and N2 is an integer greater than 1; and the communication unit is further configured to receive, on the N2 resources, bits in the second RV.

According to a tenth aspect, a data transmission apparatus is provided. The apparatus includes a communication unit and a processing unit. The processing unit is configured to determine a PUSCH resource and a first value based on the slot format and the PUSCH parameter. The processing unit is further configured to determine X RVs of a PUSCH based on the first value, where X is an integer greater than 0. The communication unit is configured to receive at least one of the X RVs on the PUSCH resource.

In a possible implementation, X is the same as the first value; or X is a value that is greater than the first value and closest to the first value or a value that is less than the first value and closest to the first value in a plurality of optional values, where the plurality of optional values are preset.

According to an eleventh aspect, a data transmission apparatus is provided, including a processor. The processor is connected to a memory. The memory is configured to store computer-executable instructions, and the processor executes the computer-executable instructions stored in the memory, to implement any method according to any one of the first aspect to the fifth aspect. For example, the memory and the processor may be integrated, or may be independent components. If the memory and the processor are independent components, the memory may be located inside the data transmission apparatus, or may be located outside the data transmission apparatus. When performing any method according to any one of the first aspect to the third aspect, the data transmission apparatus may be, for example, a terminal or a chip located inside or outside the terminal. When performing any method according to the fourth aspect or the fifth aspect, the data transmission apparatus may be, for example, a network device or a chip located inside or outside the network device.

In a possible implementation, the processor includes a logic circuit, and further includes an input interface and/or an output interface. For example, the output interface is configured to perform a sending action in a corresponding method, and the input interface is configured to perform a receiving action in a corresponding method.

In a possible implementation, the data transmission apparatus further includes a communication interface and a communication bus. The processor, the memory, and the communication interface are connected by using the communication bus. The communication interface is configured to perform sending and receiving actions in a corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in a corresponding method.

In a possible implementation, the data transmission apparatus exists in a product form of a chip.

According to a twelfth aspect, a chip is provided, including a processor and an interface. The processor is coupled to a memory by using the interface. When the processor executes a computer-executable program or computer-executable instructions in the memory, any method according to any one of the first aspect to the fifth aspect is performed.

According to a thirteenth aspect, a communication system is provided, including: a data transmission apparatus that performs any method according to any one of the first aspect to the third aspect and a data transmission apparatus that performs any method according to the fourth aspect or the fifth aspect.

According to a fourteenth aspect, a computer-readable storage medium is provided, including computer-executable instructions. When the computer-executable instructions are run on a computer, the computer is enabled to perform any method according to any one of the first aspect to the fifth aspect.

According to a fifteenth aspect, a computer program product including computer-executable instructions is provided. When the computer-executable instructions are run on a computer, the computer is enabled to perform any method according to any one of the first aspect to the fifth aspect.

For technical effects of any implementation of the fourth aspect to the fifteenth aspect, refer to technical effects of corresponding implementations of the first aspect to the third aspect. Details are not described herein again.

It should be noted that, the solutions in the foregoing aspects may be combined in a case of no conflict.

BRIEF DESCRIPTION OF DRAWINGS

FIG. 3 is a schematic diagram of a frequency domain resource;

FIG. 4 is another schematic diagram of a frequency domain resource;

FIG. 5 is a schematic diagram of a communication scenario to which this application is applicable;

DESCRIPTION OF EMBODIMENTS

Figure 1:
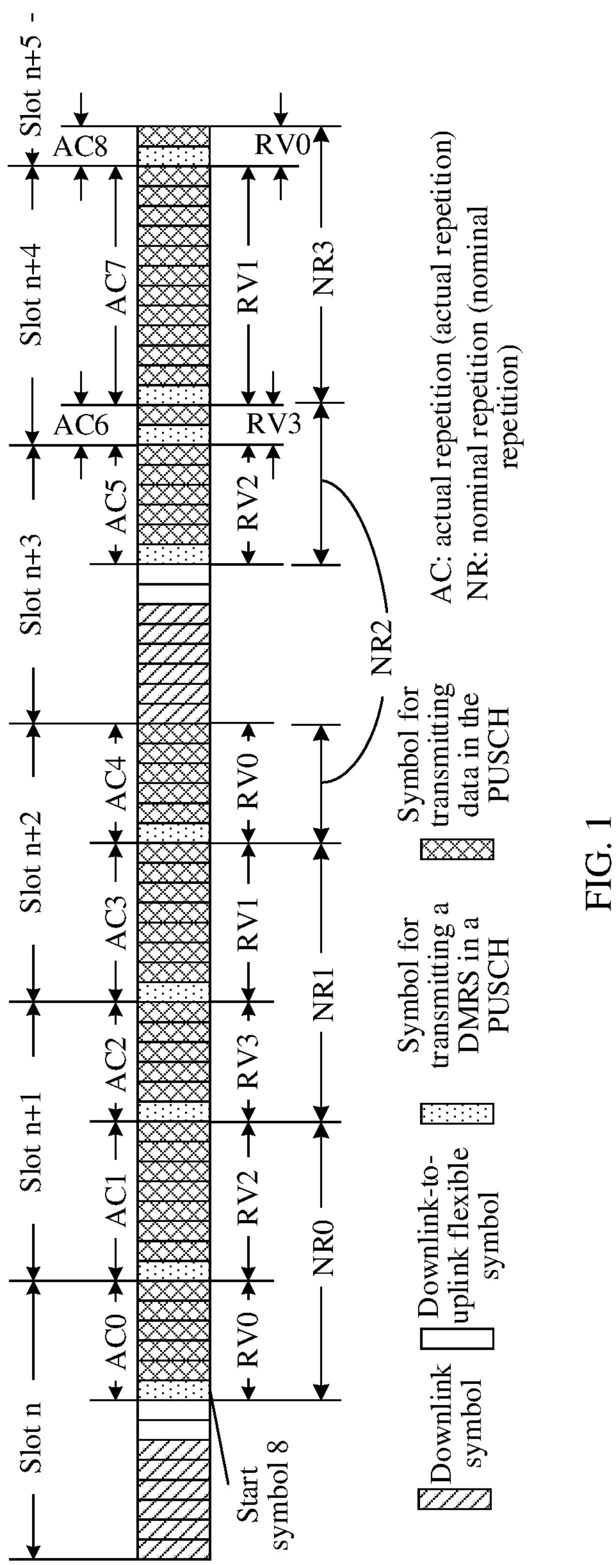
FIG. 1 is a schematic diagram of an RV sent on an actual repetition.

In descriptions of this application, unless otherwise specified, "/" means "or", for example, A/B may represent A or B. The term "and/or" used herein describes only an association relationship for describing associated objects and represents that three relationships may exist. For example, A and/or B may represent the following three cases: Only A exists, both A and B exist, and only B exists. In the descriptions of this application, unless otherwise specified, "at least one" means one or more, and "a plurality of" means two or more.

In addition, for ease of clear description of the technical solutions in embodiments of this application, terms such as "first" and "second" in embodiments of this application are used to distinguish same or similar items with basically same functions and roles. A person skilled in the art may understand that the terms such as "first" and "second" do not limit a quantity and an execution sequence, and the terms such as "first" and "second" do not necessarily limit a difference.

It should be noted that, in this application, the term such as "example" or "for example" is used to represent giving an example, an illustration, or a description. Any embodiment or design scheme described as "example" or "for example" in this application should not be explained as being more preferable or having more advantages than other embodiments or design schemes. Exactly, the term such as "example" or "for example" is intended to present related concepts in a specific manner.

For ease of understanding of this application, some concepts and content in embodiments of this application are briefly described first.

1. Slot (Slot)

In a new radio (new radio, NR), for a normal (normal) cyclic prefix (cyclic prefix, CP), one slot includes 14 orthogonal frequency division multiplexing (orthogonal frequency division multiplexing, OFDM) symbols (referred to as symbols for short below). For an extended (extended) CP, one slot includes 12 symbols. For ease of description, an example in which one slot includes 14 symbols is used for description in this application. However, one slot is not limited to including only 14 symbols.

In the slot, the 14 symbols are numbered in ascending order. A smallest symbol is numbered 0, and a largest symbol is numbered 13. In this embodiment of this application, a symbol whose index (that is, number) is i is denoted as a symbol i, and one slot includes a symbol 0 to a symbol 13. In addition, in this application, a slot whose index (that is, number) is f is denoted as a slot f below. Herein, f is an integer greater than or equal to 0, and i is an integer greater than or equal to 0 and less than or equal to 13. In this application, an example in which both a slot and a symbol are numbered from 0 is used for description. During actual implementation, a slot and/or a symbol may alternatively be numbered from 1 or another number. This is not limited in this application.

One slot may include symbols of one or more types. The symbols include: a symbol used for downlink sending (denoted as a downlink symbol), a symbol used for flexible transmission (denoted as a flexible symbol), a symbol used for uplink sending (denoted as an uplink symbol), a guard interval symbol, and the like. A composition of a slot may be referred to as a slot format (slot format, SF).

2. Resource Element (Resource Element, RE)

An RE is a smallest resource unit in a physical resource. One symbol is occupied in time domain, and one subcarrier is occupied in frequency domain.

3. De-Modulation Reference Signal (De-Modulation Reference Signal, DMRS)

The DMRS is used to demodulate a PUSCH. The DMRS is carried on some symbols in the PUSCH. The PUSCH includes DMRSs and data.

4. Mapping Type (Mapping Type) of PUSCH

The PUSCH includes two mapping types, namely, Type A and Type B. The mapping type may be understood as a resource allocation type. In the NR communication standard, both Type A and Type B indicate a start symbol (identified as S), a symbol length (identified as L), and a possible value range of S+L. For example, Table 6.1.2.1-1 (referred to as Table 1 in this application) in Section 6.1.2.1 in Technology standard (Technology Standard, TS) 38.214 of the 3rd generation partnership project (3rd generation partnership project, 3GPP) shows Valid S and L combinations (Valid S and L combinations) of Type A and Type B.

TABLE 1

| Valid S and L combinations | | | | | | |
|---|---|---|---|---|---|---|
| | Normal cyclic prefix | | | Extended cyclic prefix | | |
| PUSCH mapping type | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14}, {1, . . . , 27} | {0, . . . , 11} | {1, . . . , 12} | {1, . . . , 12}, {1, . . . , 23} |

Parameters in a row of Type A are for repetition Type A only (repetition Type A only). "{1 . . . , 14}" and "{1, . . . , 12}" in a column of S+L in a row of Type B are for repetition Type A (for repetition Type A). "{1, . . . , 27}" and "{1, . . . , 23}" in the column of S+L in the row of Type B are for repetition Type B (for repetition Type B).

5. PUSCH Time Domain Resource Allocation

Currently, a network device may configure a PUSCH time domain resource allocation table for a terminal by using higher layer signaling (for example, radio resource control (radio resource control, RRC) signaling). The time domain resource allocation table includes a plurality of rows, one row is a combination of time domain resource allocation parameters, and each row corresponds to one row index. Each row includes the following parameter configurations: a PUSCH mapping type, $K_2$, and a start and length indicator value (start and length indicator value, SLIV).

The PUSCH mapping type is Type A or Type B. $K_2$ is used to configure an offset of a slot in which the PUSCH is located compared with a slot in which downlink control information (downlink control information, DCI) for scheduling the PUSCH is located. For example, a slot in which the DCI for scheduling the PUSCH is located is a slot $n-K_2$. In this case, a slot for sending the PUSCH is a slot n. The SLIV is used to configure a start symbol S and a symbol length L of the PUSCH, where S and L meet limitations in Table 1.

Specifically, the PUSCH needs to be scheduled by using a physical downlink control channel (physical downlink control channel, PDCCH). DCI Format (DCI Format) 0-0 and DCI Format 0-1 are used to schedule the PUSCH. A time domain resource assignment (Time domain resource assignment) field in the DCI corresponds to a row in the time domain resource allocation table. A time domain resource of the PUSCH is determined by using two parameters. A sending slot of the PUSCH is determined by using $K_2$, and a symbol location occupied by the PUSCH in the slot is determined by using S and L.

For example, a default time domain resource allocation table may be Table 2. Herein, j is determined by using $\mu_{PUSCH}$. For a value of $\mu_{PUSCH}$, refer to Table 3. $\mu_{PUSCH}$ is related to a subcarrier spacing, and the subcarrier spacing is $15*2^{\mu}$ kHz (kilohertz). For a correspondence between j and $\mu_{PUSCH}$, refer to Table 3.

TABLE 2

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |

TABLE 2-continued

| Row index | PUSCH mapping type | $K_2$ | S | L |
|---|---|---|---|---|
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 3

| $\mu_{PUSCH}$ | j |
|---|---|
| 0 | 1 |
| 1 | 1 |
| 2 | 2 |
| 3 | 3 |

Figure 2:
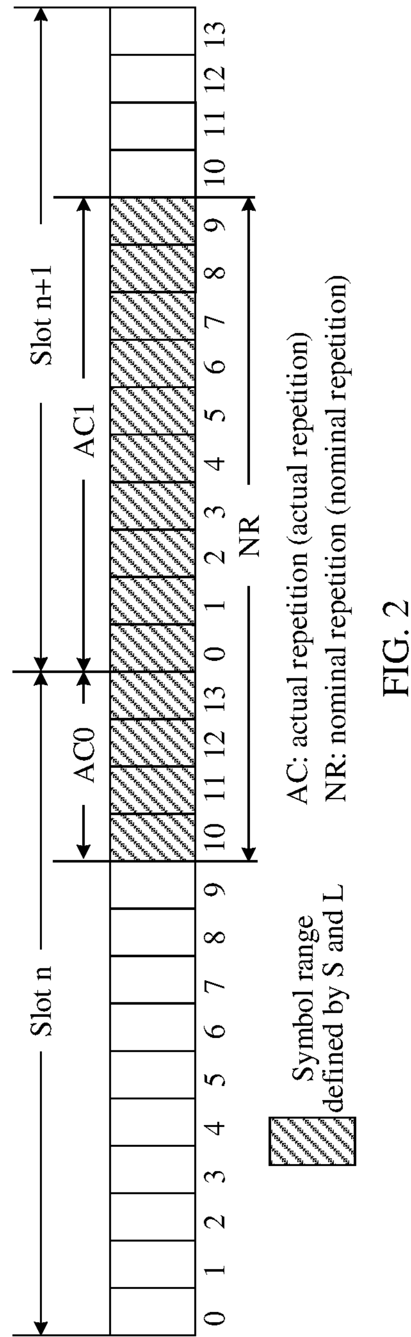
FIG. 2 is a schematic diagram of an actual repetition and a nominal repetition.

If S=10 and L=14, referring to FIG. 2, a sending location of the PUSCH starts from the $11^{th}$ symbol (that is, a start symbol 10) in a slot (assumed to be the slot n) that first carries the PUSCH, and lasts for 14 symbols. Because a quantity of symbols in one slot is 14, the continuous 14 symbols include last 4 symbols in the slot n and first 10 symbols in a slot n+1. In such a case that two slots are spanned, a period from the $11^{th}$ symbol in the slot n to the $10^{th}$ symbol in a next slot is denoted as a nominal repetition, a period from the $11^{th}$ symbol in the slot n to the $14^{th}$ symbol in the slot n is denoted as an actual repetition (that is, an actual repetition 0), and a period from the $1^{st}$ symbol in the slot n+1 to the $10^{th}$ symbol in the slot n+1 is recorded as another actual repetition (that is, an actual repetition 1).

6. PUSCH Frequency Domain Resource Allocation

A frequency domain resource of the PUSCH is indicated by using a frequency domain resource indication field of the PDCCH. The frequency domain resource is indicated in two manners.

The first indication manner is type0 (type0). A frequency domain granularity of the indication method is a resource block group (resource block group, RBG). Using an example in which a bandwidth is 10 resource blocks (resource blocks, RBs), and a size of the RBG (that is, a quantity of RBs included in the RBG) is 2, as shown in FIG. 3, 10 RBs may be divided into five groups to obtain 5 RBGs. The frequency domain resource occupied by the PUSCH is indicated in a form of a bitmap (bitmap). For example, indication information in the PDCCH is 10001, and the PUSCH occupies RBG0 and RBG4.

The second indication manner is type1 (type1). In this indication manner, a start location (denoted as $RB_{start}$) and L' of an RB in frequency domain are indicated in the PDCCH, where L' represents a length of an occupied RB. For example, a bandwidth of 10 RBs. Referring to FIG. 4, if $RB_{start}$=2, and L'=3, frequency domain resources occupied by the PUSCH are RB2, RB3, and RB4.

7. RV

Data obtained after channel coding (turbocoder) is performed on a transport block (transport block, TB) includes three segments. A first segment may be considered as system bits (that is, information bits), and remaining two segments are redundant data. The three segments of data are successively placed in a ring buffer. The RV actually indicates a location of the ring buffer from which the data is fetched. Currently, the RV includes RVs whose indexes are 0, 2, 3, and 1, which may be respectively denoted as RV0, RV2, RV3, and RV1. RV0, RV2, RV3, and RV1 each correspond to a start position for fetching data in the ring buffer. RV0 includes a largest quantity of system bits, RV1 and RV3 have a smaller quantity of system bits, and RV2 has a smallest quantity of system bits.

A TB size (TB size, TBS), that is, a quantity of bits (bits) included in a TB, may be determined based on a quantity of REs used to send a PUSCH. The quantity of REs used to send the PUSCH may be determined based on information such as a quantity of symbols included in a nominal repetition, a quantity of RBs used to send the PUSCH and a quantity of DMRS resources that are configured by the network device. For example, if the quantity of REs used to send a PUSCH is 396, the TBS is 120 bits, and if data obtained after channel coding is performed on the TB includes 360 bits, the 396 REs are used to send the 360 bits. If the quantity of REs used to send a PUSCH is greater than a quantity of bits in encoded data, remaining resource may not carry any bit.

The sending of the PUSCH described in this embodiment of this application may be understood as sending data carried on the PUSCH, and the data carried on the PUSCH is data obtained after channel coding is performed on the TB.

8. PUSCH Repetition

PUSCH repetition means sending of a plurality of PUSCHs, and the plurality of PUSCHs are a plurality of pieces of same uplink data. Sending of one PUSCH (that is, one piece of uplink data) may be referred to as one repetition of the PUSCH. The plurality of pieces of same uplink data are a plurality of same or different RVs obtained after channel coding is performed on a same system bit.

For Type B, the communication standard introduces a parameter "a number of repetitions (numberOfRepetitions-r16)" to configure the number of repetitions. Herein, numberOfRepetitions-r16 has eight configurable values, and is indicated by 3 bit. Various values of 3 bit respectively correspond to {n1, n2, n3, n4, n7, n8, n12, n16}. A value following n indicates the number of repetitions. For example, n1 indicates that the PUSCH is sent once, and n16 indicates that the PUSCH is sent for 16 times. The network device may configure one of the eight configurable values for the terminal by using higher layer signaling, for example, RRC signaling, to indicate the number of repetitions for the terminal. For Type B, starting from a start symbol S in a start slot for repeatedly sending the PUSCH, L*numberOfRepetitions-r16 available symbols are all used for PUSCH repetition. In this application, "*" means "multiply".

For Type A, S+L is less than or equal to 14. When the number of repetitions (assuming that the number of repetitions is R1) is configured for the terminal, the terminal detects each slot in R1 slots (consecutive R1 slots from the start slot). When L symbols from the start symbol S in a slot are all available symbols, the PUSCH is sent on the slot, or otherwise, sending of the PUSCH is on the slot is abandoned, and whether other slots meet the condition is detected.

The available symbol in this application is not a downlink symbol, a downlink-to-uplink flexible symbol, or a symbol occupied by another transmission.

9. RV of PUSCH Repeatedly Sent

To enable a receiving end to improve a decoding capability by using an incremental redundancy (incremental redundancy, IR) combined reception method, the network device may perform configuration, so that different RVs are used when the PUSCH is repeatedly sent for a plurality of times. The RV used in each time of sending the PUSCH is determined by using both an index p of an actual repetition corresponding to this sending and $rv_{id}$ indicated by an RV indication field in DCI for scheduling the PUSCH, where $rv_{id}$ is an index of the RV. For example, it is specified in 3GPP TS 38.214 that an RV corresponding to an actual repetition that is used to send the PUSCH and whose index is p is determined based on Table 4. Herein, "mod" in Table 4 means "modulo".

TABLE 4

| $rv_{id}$ indicated by DCI for | $rv_{id}$ corresponding to actual repetition whose index is p | | | |
|---|---|---|---|---|
| scheduling the PUSCH | p mod 4 = 0 | p mod 4 = 1 | p mod 4 = 2 | p mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

The foregoing briefly describes some concepts and content in embodiments of this application.

The technical solutions in embodiments of this application may be applied to a 4th generation (4th Generation, 4G) system, various systems evolved based on the 4G system, and a fifth generation (5th generation, 5G) system, various systems evolved based on the 5G system, or applied to a future evolved system or a multi-communication fusion system. The 4G system may also be referred to as an evolved packet system (evolved packet system, EPS). A core network (core network, CN) of the 4G system may be referred to as an evolved packet core (evolved packet core, EPC), and an access network may be referred to as long term evolution (long term evolution, LTE). A core network of the 5G system may be referred to as a 5GC (5G core), and an access network may be referred to as an NR. The 5G system may be a non-standalone (non-standalone, NSA) 5G system or a standalone (standalone, SA) 5G system.

Network elements in this application include a network device and a terminal in a communication system. Refer to FIG. 5. A method provided in embodiments of this application mainly relates to communication between a network device and a terminal. The network device and the terminal may communicate with each other by using an air interface (a Uu interface, that is, a UTRAN-to-UE interface).

The network device in embodiments of this application is an entity on a network side that is configured to send a signal, or receive a signal, or send a signal and receive a signal. The network device may be an apparatus deployed in a radio access network (radio access network, RAN) to provide a wireless communication function for the terminal, for example, may be a transmission reception point (transmission reception point, TRP), a base station, or a control node in various forms (for example, a network controller or a wireless controller (for example, a wireless controller in a cloud radio access network (cloud radio access network, CRAN) scenario)). Specifically, the network device may be a macro base station, a micro base station (also referred to as a small cell), a relay station, an access point (access point, AP), or the like in various forms, or may be an antenna panel of a base station. The control node may be connected to a plurality of base stations, and configure resources for a plurality of terminals covered by the plurality of base stations. In systems that use different radio access technologies, names of devices that have a base station function may vary. For example, the name may be a macro base station evolved NodeB (evolved NodeB, eNB or eNodeB) in a universal mobile telecommunications system (universal mobile telecommunications system, UMTS) or an LTE system, the name may be a micro base station eNB in a heterogeneous network (heterogeneous network, HetNet) scenario, the name may be a baseband unit (baseband unit, BBU) and a remote radio unit (remote radio unit, RRU) in a distributed base station scenario, the name may be a baseband pool (BBU pool) and an RRU in a CRAN scenario, the name may be a next generation node base station (next generation node base station, gNB) in a 5G system or an NR system. A specific name of the base station is not limited in this application. Alternatively, the network device may be a network device or the like in a future evolved public land mobile network (public land mobile network, PLMN).

The terminal in embodiments of this application is an entity on a user side that is configured to receive a signal, or send a signal, or receive a signal and send a signal. The terminal is configured to provide one or more of a voice service and a data connectivity service for a user. The terminal may also be referred to as user equipment (user equipment, UE), a terminal device, an access terminal, a subscriber unit, a subscriber station, a mobile station, a remote station, a remote terminal, a mobile device, a user terminal, a wireless communication device, a user agent, or a user apparatus. The terminal may be a mobile station (mobile station, MS), a subscriber unit (subscriber unit), an uncrewed aerial vehicle, an internet of things (internet of things, IoT) device, a station (station, ST) in a wireless local area network (wireless local area network, WLAN), a cellular phone (cellular phone), a user handheld communication device (such as a smartphone (smartphone), a mobile phone, or a tablet computer), a cordless phone, a wireless data card, a session initiation protocol (session initiation protocol, SIP) telephone, a wireless local loop (wireless local loop, WLL) station, a personal digital assistant (personal digital assistant, PDA) device, a laptop computer (laptop computer), a machine type communication (machine type communication, MTC) terminal, a handheld device or a computing device having a wireless communication function, another processing device connected to a wireless modem, a vehicle-mounted device (such as a vehicle-mounted communication module or another embedded communication module), or a wearable device (which may also be referred to as a wearable intelligent device). Alternatively, the terminal may be a terminal or the like in a future evolved PLMN.

In the architecture shown in FIG. 5, downlink sending from the network device to the terminal and uplink sending from the terminal to the network device may exist. Because costs of the network device are relatively high, a coverage range of downlink sending is generally larger than that of uplink sending. Due to a cost limitation factor on a terminal side, only a relatively low-cost power amplifier can be use d, and a power upper limit of the power amplifier is lower than that on a network device side. Therefore, research on coverage enhancement mainly focuses on how to increase the coverage range of uplink sending. Uplink sending generally includes a physical uplink control channel (physical uplink control channel, PUCCH) and a PUSCH. The PUCCH is a control channel, has a small amount of information to be sent, and does not require a very high signal-to-noise ratio (signal noise ratio, SNR). Even if the terminal is relatively far away from the network device, an SNR requirement can be met. Therefore, the coverage range is relatively large. The PUSCH is a data channel, has a large amount of information to be sent, and requires a higher SNR. An SNR requirement can be met only when the terminal is relatively close to the network device. Therefore, the coverage range is relatively small. Therefore, how to increase the coverage range of the PUSCH is a more urgent problem.

A method for increasing the coverage range of the PUSCH is repeatedly sending the PUSCH. A larger number of repetitions indicates that more symbols may be included in the PUSCH. In this case, the SNR may be appropriately reduced, so as to improve the coverage range of the PUSCH. It can be learned from the foregoing description that, in Type A, the PUSCH can be sent only at a fixed location on a slot, and if a symbol at the location is unavailable, this sending is abandoned. However, in Type B, the PUSCH may be sent by using all available symbols as much as possible. Therefore, Type B can use resources to a greater extent than Type A.

Although all available symbols can be used as much as possible in Type B, symbols that are on different slots and that are in one nominal repetition are divided into different actual repetitions. As a result, resources corresponding to actual repetitions are very discrete, and one RV of a PUSCH is sent on each actual repetition. Consequently, the RV of the PUSCH cannot be completely sent, decoding performance of the network device is affected, and reliability of data transmission is reduced.

For example, referring to FIG. 1, a PUSCH with four nominal repetitions is scheduled to be sent, a first nominal repetition spans two slots and is therefore divided into an actual repetition o and an actual repetition 1, a second nominal repetition spans two slots and is therefore divided into an actual repetition 2 and an actual repetition 3, a third nominal repetition spans three slots and is therefore divided into an actual repetition 4, an actual repetition 5, and an actual repetition 6, and a fourth nominal repetition spans two slots and is therefore divided into an actual repetition 7 and an actual repetition 8. As can be learned from Table 4, 9 actual repetitions cyclically carry different RVs based on an actual repetition index, and a carrying version is determined by using a result of a modulo operation of 4 by the actual repetition index based on an indication of the DCI. For example, $rv_{id}$ carried by the DCI is 0. As can be learned from Table 4, an RV carried by the actual repetition 0, the actual repetition 4, and the actual repetition 8 is RV0, an RV carried by the actual repetition 1 and the actual repetition 5 is RV2, an RV carried by the actual repetition 2 and the actual repetition 6 is RV3, and an RV carried by the actual repetition 3 and the actual repetition 7 is RV1.

Because the TBS is determined based on a symbol length of a nominal repetition, and each actual repetition carries one RV, the RV carried on each actual repetition carries only the former part of information in the RV, and the latter part of information in the RV is not sent. For example, for the actual repetition 0, the former part of information of RV0 is sent on the actual repetition 0, and the latter part of information is not sent. For the actual repetition 1, the former part of information of RV2 is sent on the actual repetition 1, and the latter part of information is not sent. For the actual repetition 2, the former part of information of RV3 is sent on the actual repetition 2, and the latter part of information is not sent. For the actual repetition 3, the former part of information of RV1 is sent on the actual repetition 3, and the latter part of information is not sent. Because RV0 includes a largest quantity of system bits, sending of RV0 is not completed, which causes a loss of decoding performance.

To improve decoding performance of the network device and reliability of data transmission, this application provides a data transmission method. The data transmission method may be implemented by using the method provided in Embodiment 1, Embodiment 2, or Embodiment 3. In Embodiment 1, the terminal continuously sends an RV of the PUSCH on different resources, so as to send a complete RV as much as possible. This improves transmission performance. In Embodiment 2, the terminal sends more RVs on different resources, so as to send a complete system bit as much as possible. This improves transmission performance. In Embodiment 3, the terminal sends RV0 on a resource with a largest quantity of symbols, so as to send a complete system bit as much as possible. This improves transmission performance. The following separately describes the methods provided in Embodiment 1 to Embodiment 3.

Embodiment 1

Figure 6:
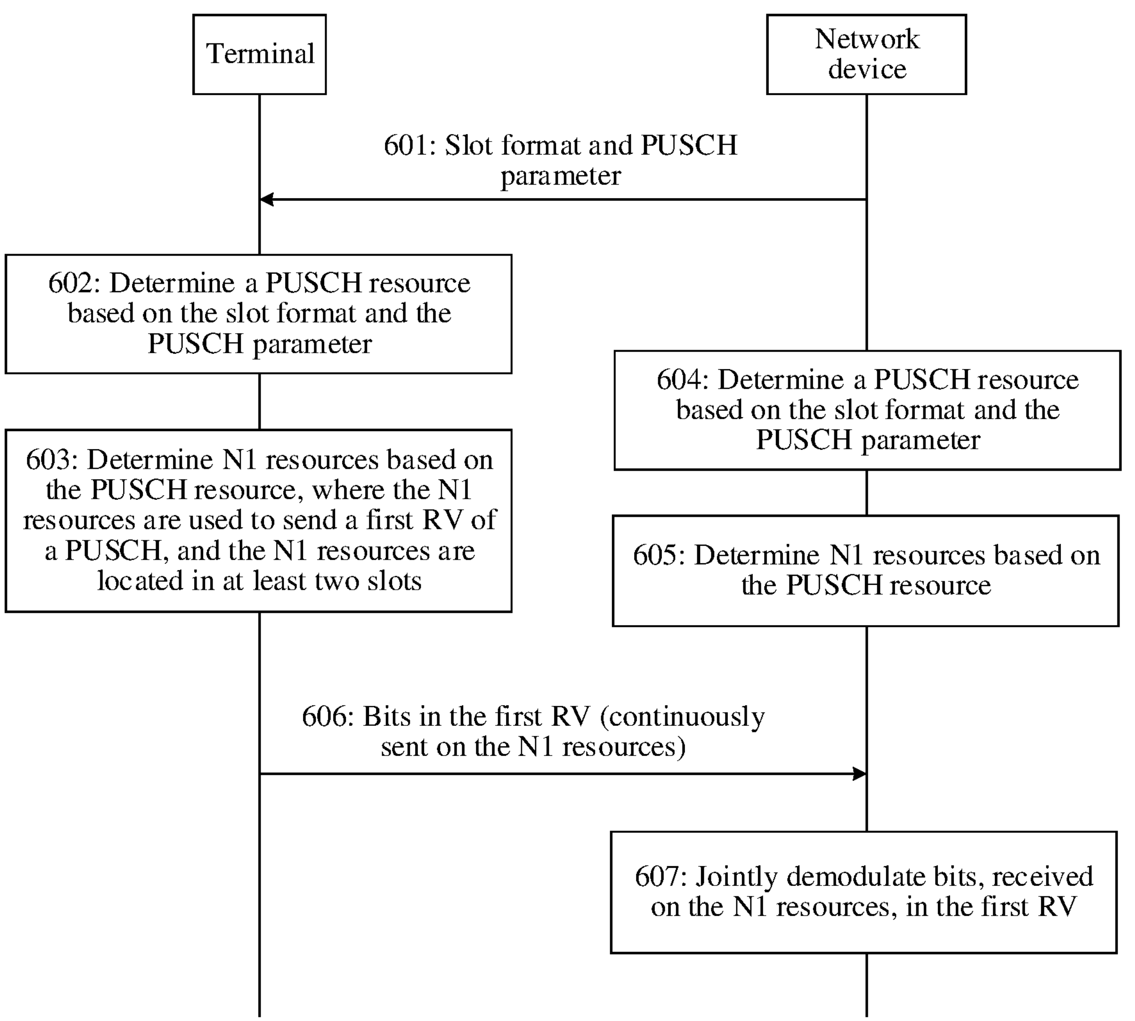
FIG. 6 is an interaction flowchart of a data transmission method according to an embodiment of this application.

Refer to FIG. 6. The method provided in Embodiment 1 includes the following steps.

601: A network device sends a slot format and a PUSCH parameter to a terminal. Correspondingly, the terminal receives the slot format and the PUSCH parameter from the network device.

In embodiments of this application, an action performed by the network device may alternatively be performed by a chip located outside or inside the network device, and an action performed by the terminal may alternatively be performed by a chip located outside or inside the terminal. For ease of description, in this application, the network device and the terminal are used as examples to describe the method provided in this application.

The slot format indicates a type of each symbol in a slot. The network device may semi-statically or dynamically configure a slot format for the terminal. A specific configuration process is well known to a person skilled in the art, and details are not described herein again. The PUSCH parameter is used to determine a PUSCH resource. The PUSCH resource includes a PUSCH time domain resource and a PUSCH frequency domain resource. The PUSCH parameter includes a time domain parameter and a frequency domain parameter. The time domain parameter is used to determine the PUSCH time domain resource, and the frequency domain parameter is used to determine the PUSCH frequency domain resource. The time domain parameter may include one or more of the foregoing corresponding start symbol S, indexes of the quantity L of symbols and $K_2$ (for example, row index in Table 2), and a number of repetitions. The frequency domain parameter includes parameters used to indicate the PUSCH frequency domain resource (for example, a bitmap, $RB_{start}$, and L'). For details, refer to the foregoing content about frequency domain resource allocation for the PUSCH. The PUSCH parameter may also be referred to as a PUSCH scheduling parameter.

602: The terminal determines the PUSCH resource based on the slot format and the PUSCH parameter.

During specific implementation of step 602, the terminal may determine, based on $K_2$ indicated by the time domain parameter and a slot (assumed to be a slot $n-K_2$) in which DCI for scheduling the PUSCH is located, that a start slot for repeatedly sending the PUSCH is a slot n.

After determining the start slot, the terminal may determine the PUSCH time domain resource in Manner 11 or Manner 12.

Manner 11: It is determined, based on the slot format, the start symbol S, the quantity L of symbols, and the number of repetitions indicated by the time domain parameter, that number of repetitions*L available symbols starting from the start symbol S in the start slot are the PUSCH time domain resource. For example, if S=8, L=14, number of repetitions=4, and a slot format of each slot is shown in (a) in FIG. 7 and (b) in FIG. 7, 56 (that is, 14*4) symbols starting from a symbol 8 in the slot n are the PUSCH time domain resource. In this case, PUSCH time domain resource determined by the terminal includes time domain resources corresponding to a resource 0 to a resource 8 shown in (a) in FIG. 7 and (b) in FIG. 7.

Manner 12: It is determined, based on the number of repetitions (assumed to be R), that a time domain resource including available symbols in R slots is the PUSCH time domain resource. The R slots may have the following cases:

(1) The R slots are R consecutive slots starting from the start slot.

(2) The R slots are R slots that start from the start slot and do not include a downlink slot.

(3) The R slots are R slots that start from the start slot and does not include a downlink slot and a special slot.

(4) The R slots are R uplink slots starting from the start slot.

(5) The R slots are R slots that start from the start slot and meet a second condition, where the second condition is that all L symbols starting from the start symbol S in the start slot are available symbols, and all symbols in slots after the start slot in the R slots are available symbols. Herein, S and L are configured by the PUSCH parameter.

For example, it is assumed that R=6, and the R slots are N slots that start from the start slot and do not include a downlink slot. Refer to (a) in FIG. 8 and (b) in FIG. 8. Because a slot n to a slot n+5 do not include a downlink slot, the R slots are the slot n to the slot n+5, and a time domain resource including available symbols in the slot n to the slot n+5 is the PUSCH time domain resource, that is, the PUSCH time domain resource includes time domain resources corresponding to a resource 0 to a resource 5 shown in (a) in FIG. 8 and (b) in FIG. 8. For determining of resources corresponding to other RVs than the first RV in (a) in FIG. 7 and (b) in FIG. 7, and (a) in FIG. 8 and (b) in FIG. 8, and determining of an RV sent on each resource, refer to related descriptions below.

For a process in which the terminal determines the PUSCH frequency domain resource based on the frequency domain parameter, refer to the foregoing content about frequency domain resource allocation for the PUSCH. Details are not described herein again.

The PUSCH resource includes a plurality of resources, one resource may correspond to one index, and a resource with a larger index is located later in time domain. In one case, one resource is the same as a resource corresponding to an actual repetition. In this case, an index of the resource may also be considered as an index of the actual repetition, for example, the resource 0 to the resource 8 shown in (a) in FIG. 7 and (b) in FIG. 7. In another case, one resource is a resource corresponding to an available symbol in one slot, for example, the resource 0 to the resource 5 shown in (a) in FIG. 8 and (b) in FIG. 8.

It should be noted that, in this application, all resources are time frequency resources unless otherwise specified.

603: The terminal determines N1 resources based on the PUSCH resource, where the N1 resources are used to send a first RV of a PUSCH, the N1 resources are located in at least two slots, and N1 is an integer greater than 1.

The first RV may be any one of RV0, RV2, RV3, and RV. The N1 resources may be consecutive resources in time domain, or may be non-consecutive resources in time domain. The terminal may determine the N1 resources in Manner 21 or Manner 22.

Manner 21: The terminal determines a plurality of resources used to send the first RV of the PUSCH as the N1 resources. Specifically, the terminal may determine a location of each resource based on the slot format and the PUSCH parameter, determine, based on $rv_{id}$ indicated by DCI, an RV sent on each resource, and then determine the plurality of resources used to send the first RV of the PUSCH as the N1 resources. For example, if $rv_{id}$ indicated by the DCI is RV0, and the first RV is RV0, based on the example shown in (a) in FIG. 7, resources used to send RV0 include the resource 0, the resource 4, and the resource 8. In this case, the N1 resources include the resource 0, the resource 4, and the resource 8. For another example, if $rv_{id}$ indicated by the DCI is RV0, and the first RV is RV0, based on the example shown in (a) in FIG. 8, resources used to send RV0 include the resource 0 and the resource 4. In this case, the N1 resources include the resource 0 and the resource 4.

Manner 22: The terminal determines T resources that have consecutive indexes and have a same value of $$\left\lfloor \frac{p}{T} \right\rfloor \text{mod}_4$$

as the $N_1$ resources, where an RV corresponding to the $N_1$ resources is the first RV. Herein, p is an index of a resource, and a value of T may be preset, specified in a protocol, or determined by the network device and the terminal through negotiation. For example, if $rv_{id}$ indicated by the DCI is RV0, T=3, and the first RV is RV0, based on the example shown in (b) in FIG. 7, the N1 resources are the resource 0, the resource 1, and the resource 2. For another example, if $rv_{id}$ indicated by the DCI is RV0, T=2, and the first RV is RV0, based on the example shown in (b) in FIG. 8, the N1 resources are the resource 0 and the resource 1.

604: The network device determines a PUSCH resource based on the slot format and the PUSCH parameter.

For specific implementation of step 604, refer to step 602. The terminal needs to be replaced with the network device for understanding.

605: The network device determines N1 resources based on the PUSCH resource.

For specific implementation of step 605, refer to step 603. The terminal needs to be replaced with the network device for understanding.

It should be noted that step 604 and step 605 may be performed after step 602 and step 603, or may be performed before step 602 and step 603. This is not limited in this application.

606: The terminal continuously sends bits in the first RV on the N1 resources. Correspondingly, the network device receives the bits in the first RV on the N1 resources. The continuously sending of the bits in the first RV may also be described as continuously sending of the first RV.

Step 606 may be understood as that the terminal combines the N1 resources to send the bits in the first RV or the terminal uses the N1 resources as a whole to send the bits in the first RV.

Continuously sending of the first RV means that the complete first RV is sent on consecutive resources. To be specific, the bits in the first RV are sequentially sent from the $1^{st}$ resource in the N1 resources. If not all the bits in the first RV are sent on the $1^{st}$ resource, remaining bits in the first RV continue to be sent on the $2^{nd}$ resource after the last bit sent on the $1^{st}$ resource, and so on, until all the bits in the first RV are sent. After all the bits in the first RV are sent on a resource, when there is no remaining RE on the resource, and there is still an unused resource in the N1 resources, the first RV continue to be sent from a next resource of the resource in a manner of sending the $1^{st}$ first RV. When all the bits in the first RV are sent on a resource, and there are remaining REs on the resource, the first RV may continue to be sent on the remaining REs in a manner of sending the $1^{st}$ first RV, or it is determined, based on a quantity of remaining REs on the resource, a resource on which the first RV starts to be sent next time.

When the last bit in the first RV is sent on a resource, how to send the $1^{st}$ bit in the first RV and continuously send the bits in the first RV may be implemented in the following three manners.

Manner 1: The $1^{st}$ bit in the first RV is sent on a second resource if the last bit in the first RV is sent on a first resource, where the first resource is the $(n1)^{th}$ resource in the N1 resources, the second resource is the $(n1+1)^{th}$ resource in the N1 resources, and n1=1, 2, . . . , or N1−1.

Figure 7:
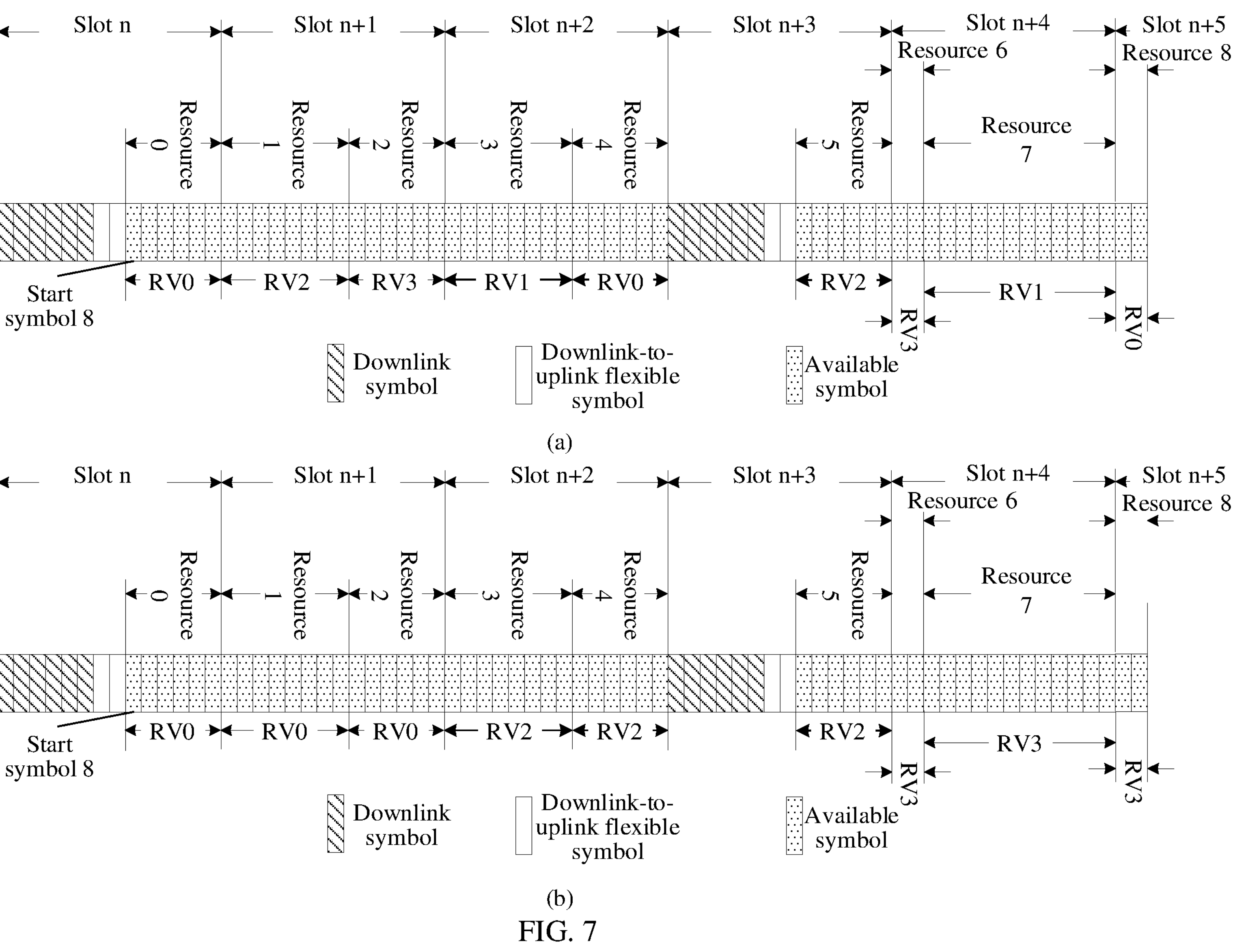
FIG. 7 is a schematic diagram of a resource and an RV sent on the resource according to an embodiment of this application.
Figure 8:
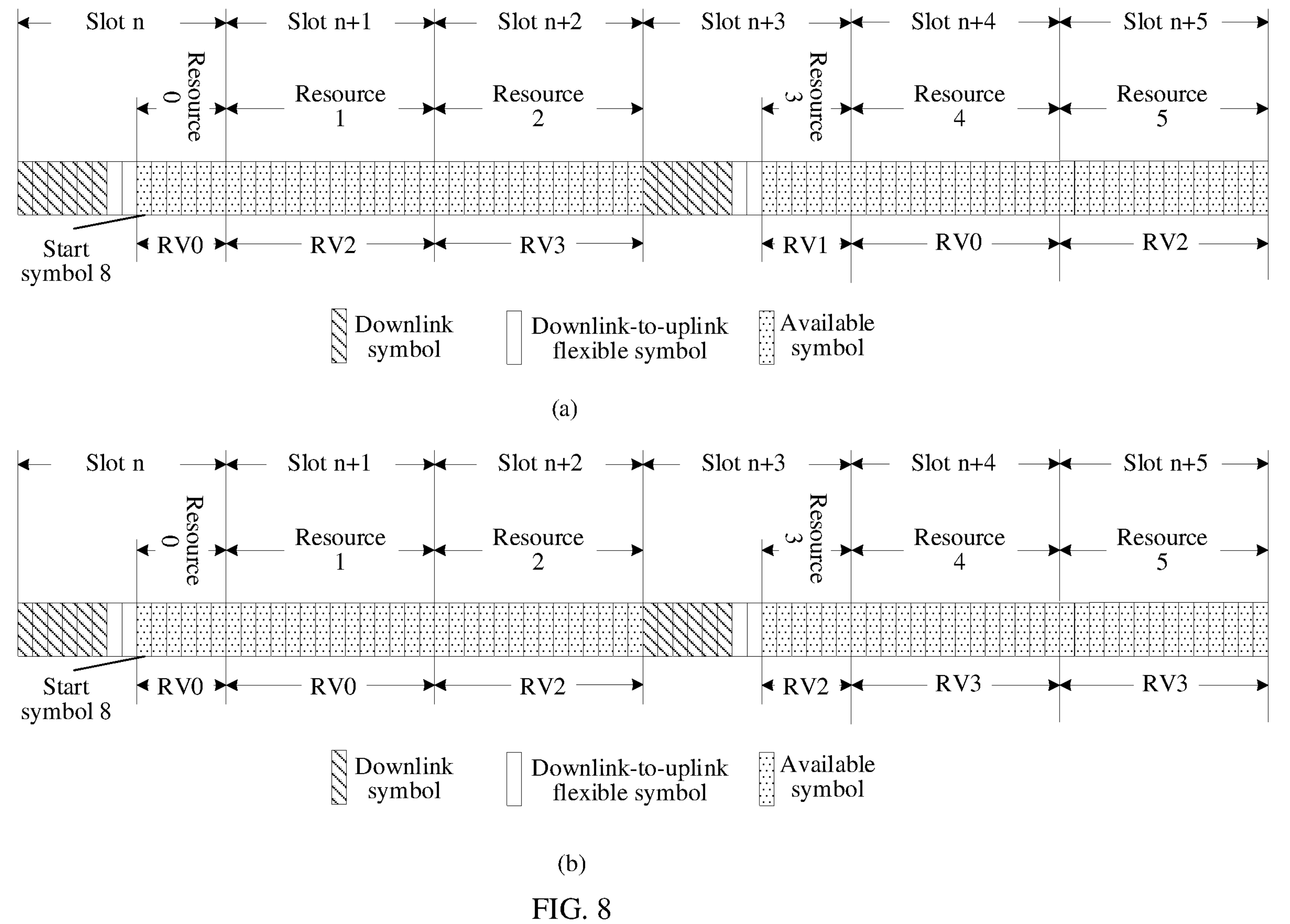
FIG. 8 is another schematic diagram of a resource and an RV sent on the resource according to an embodiment of this application.
Figure 9:
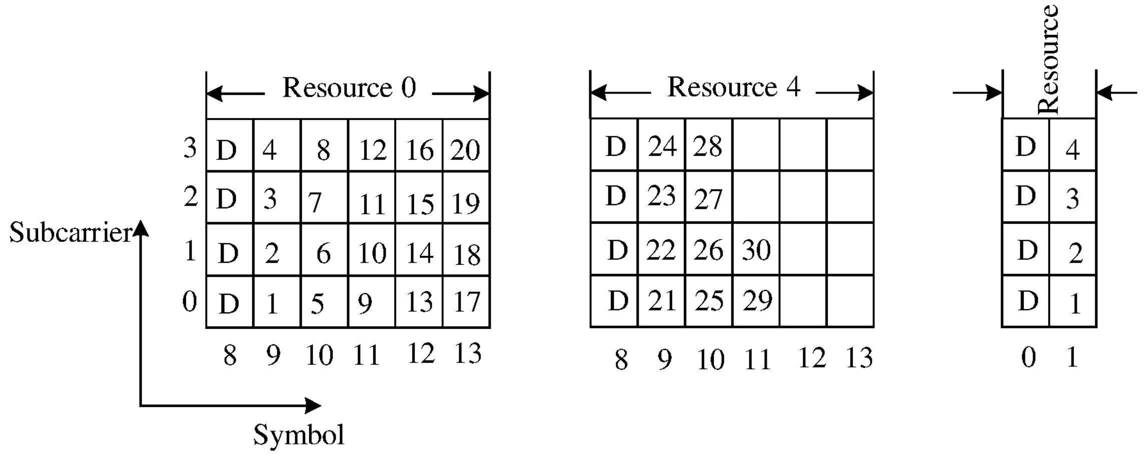
FIG. 9 is a schematic diagram of continuously sending an RV according to an embodiment of this application.
Figure 10:
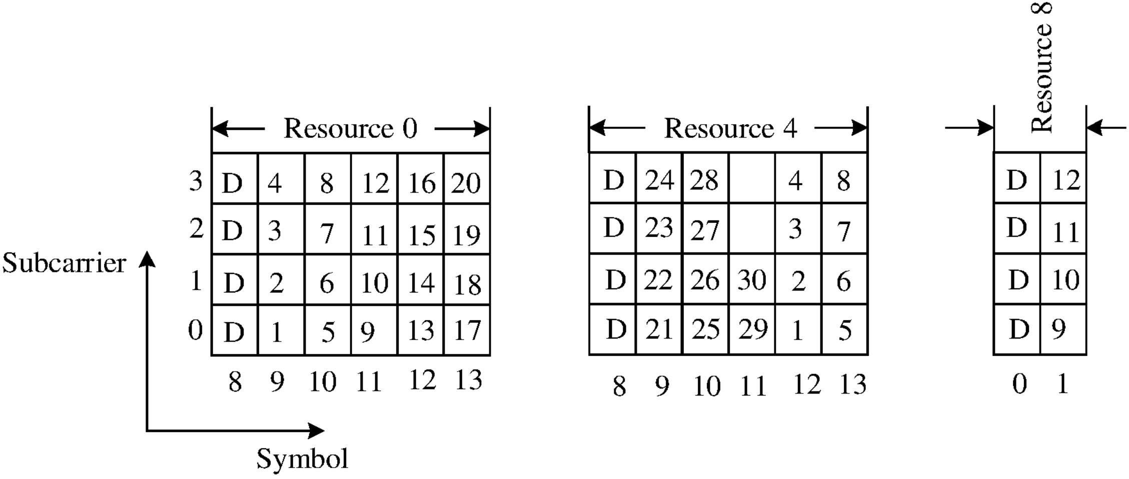
FIG. 10 is another schematic diagram of continuously sending an RV according to an embodiment of this application.
Figure 11:
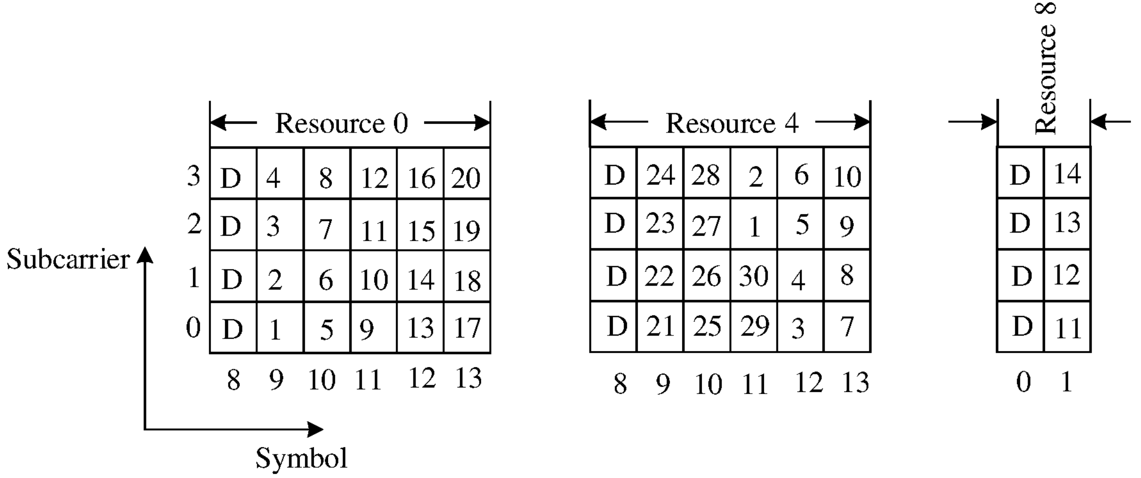
FIG. 11 is still another schematic diagram of continuously sending an RV according to an embodiment of this application.
Figure 12:
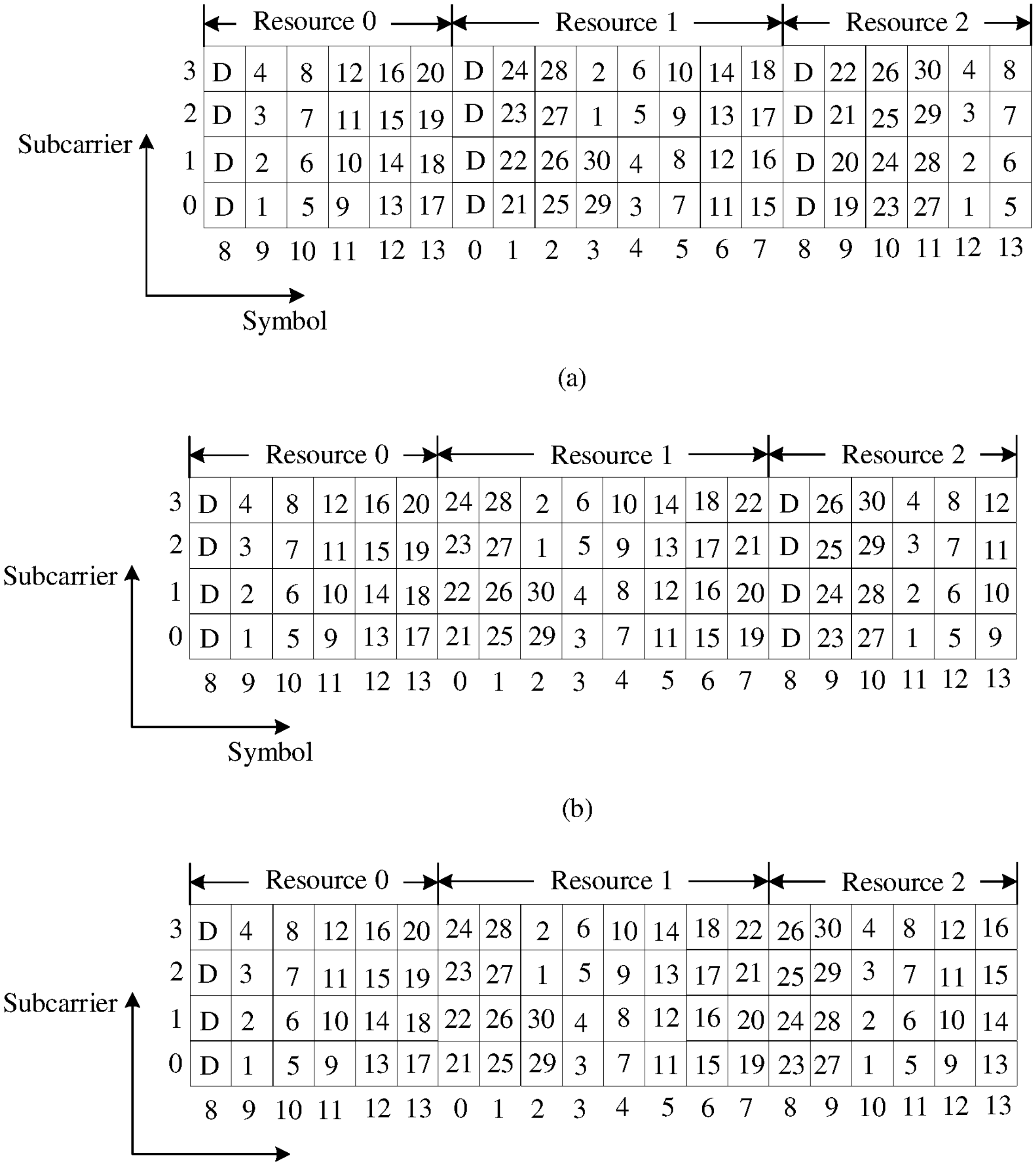
FIG. 12 is yet another schematic diagram of continuously sending an RV according to an embodiment of this application.

For example, referring to FIG. 9, it is assumed that the N1 resources are the resource 0, the resource 4, and the resource 8 shown in (a) in FIG. 7, all frequency domain resources of the N1 resources are subcarriers 0 to 3, and the first RV is RV0. In FIG. 9, a square box represents an RE, D in the square box represents that a DMRS in a PUSCH is sent on the RE, and a number (assumed to be x) in the square box represents that the $x^{th}$ bit in the first RV is sent on the RE. FIG. 10 to FIG. 12 below are similar. It is assumed that the first RV includes 30 bits, and first 20 bits in the first RV may be carried on the $1^{st}$ resource (that is, the resource 0) in the N1 resources, the bits in the first RV are sent on the $2^{nd}$ resource (that is, the resource 4) in the N1 resources from the $21^{st}$ bit in the first RV, and sending of the $1^{st}$ first RV is completed when the $30^{th}$ bit is sent. In this case, the first RV continues to be sent from the $3^{rd}$ resource (that is, the resource 8) in the N1 resources.

Optionally, in Manner 1, that the $1^{st}$ bit in the first RV is sent on a second resource includes: The $1^{st}$ bit in the first RV is sent on the second resource when a quantity of REs in a remaining resource in the first resource is less than or equal to a first threshold. In other words, when a first condition is met, the terminal sends the $1^{st}$ bit in the first RV on the second resource. If the first condition is not met, the terminal may send the $1^{st}$ bit in the first RV in Manner 2 or Manner 3. The first condition is that a quantity of REs in a remaining resource in the first resource is less than or equal to a first threshold. The quantity of REs in a remaining resource in the first resource may be 0. Herein, “less than or equal to” in the first condition may also be “less than”.

For example, based on the example shown in FIG. 9, when the terminal sends the $30^{th}$ bit on the resource 4, the remaining resource is 10 REs. If the first threshold is 12, and 10 is less than the first threshold, the terminal continues to send the first RV on the resource 8. If the first threshold is 8, and 10 is greater than the first threshold, the terminal may send the $1^{st}$ bit in the first RV in Manner 2 or Manner 3.

Manner 2: The $1^{st}$ bit in the first RV is sent on a second symbol in a first resource if the last bit in the first RV is sent on a first symbol in the first resource, where the first resource is the $(n2)^{th}$ resource in the N1 resources, the second symbol is a next symbol of the first symbol, and n2=1, 2, . . . , or N1.

For example, referring to FIG. 10, it is assumed that the N1 resources are the resource 0, the resource 4, and the resource 8 shown in (a) in FIG. 7, all frequency domain resources of the N1 resources are a subcarrier 0 to a subcarrier 3, and the first RV is RV0. It is assumed that the first RV includes 30 bits, and first 20 bits in the first RV may be carried on the $1^{st}$ resource (that is, the resource 0) in the N1 resources, the bits in the first RV are sent on the $2^{nd}$ resource (that is, the resource 4) in the N1 resources from the $21^{st}$ bit in the first RV, and sending of the $1^{st}$ first RV is completed when the $30^{th}$ bit is sent on a symbol 11. In this case, the first RV continues to be sent from a symbol 12 in the resource 4.

Optionally, that the $1^{st}$ bit in the first RV is sent on a second symbol in a first resource includes: The $1^{st}$ bit in the first RV is sent on the second symbol when a quantity of REs in a remaining resource on the first symbol is less than or equal to a second threshold. In other words, when a second condition is met, the terminal sends the $1^{st}$ bit in the first RV on the second symbol. If the second condition is not met, the terminal may send the $1^{st}$ bit in the first RV in Manner 1 or Manner 3. The second condition is that a quantity of REs in a remaining resource on the first symbol is less than or equal to a second threshold. Herein, “less than or equal to” in the second condition may also be “less than”.

For example, based on the example shown in FIG. 10, when the terminal sends the $30^{th}$ bit on the symbol 11 in the resource 4, a remaining resource is two REs. If the second threshold is 3, and 2 is less than the second threshold, the terminal continues to send the first RV from the symbol 12 in the resource 4. If the second threshold is 1, and 2 is greater than the second threshold, the terminal may send the $1^{st}$ bit in the first RV in Manner 1 or Manner 3.

The first threshold and/or the second threshold may be preset, specified in a protocol, or determined by the terminal and the network device through negotiation. This is not limited in this application.

Manner 3: The $1^{st}$ bit in the first RV is sent on a remaining resource on a first symbol in a first resource if the last bit in the first RV is sent on the first symbol in the first resource, where the first resource is the $(n3)^{th}$ resource in the N1 resources, and n3=1, 2, . . . , or N1. It may be understood that, if there is no remaining resource on the first symbol in the first resource, the $1^{st}$ bit in the first RV is sent on the second symbol in the first resource, where the second symbol is a symbol next to the first symbol.

For example, referring to FIG. 11, it is assumed that the N1 resources are the resource 0, the resource 4, and the resource 8 shown in (a) in FIG. 7, all frequency domain resources of the N1 resources are a subcarrier 0 to a subcarrier 3, and the first RV is RV0. It is assumed that the first RV includes 30 bits, and first 20 bits in the first RV may be carried on the $1^{st}$ resource (that is, the resource 0) in the N1 resources, the bits in the first RV are sent on the $2^{nd}$ resource (that is, the resource 4) in the N1 resources from the $21^{st}$ bit in the first RV, and sending of the $1^{st}$ first RV is completed when the $30^{th}$ bit is sent on a symbol 11. In this case, the first RV continues to be sent from a remaining resource on the symbol 11 in the resource 4.

When some bits in the first RV are sent on a resource, how to send a bit in the first RV on a next resource, and continuously send the bits in the first RV includes: If the last bit sent on a third resource is not the last bit in the first RV, the last bit sent on the third resource and the $1^{st}$ bit sent on a fourth resource are two adjacent bits in the first RV, the third resource is the $(n4)^{th}$ resource in the N1 resources, the fourth resource is the $(n4+1)^{th}$ resource in the N1 resources, and n4=1, 2, . . . , or N1−1.

For example, based on the example shown in FIG. 9, FIG. 10, or FIG. 11, the first RV includes 30 bits, and the first 20 bits in the first RV are carried on the $1^{st}$ resource (that is, the resource 0) in the N1 resources, and the bits in the first RV are sent on the $2^{nd}$ resource (that is, the resource 4) in the N1 resources from the $21^{st}$ bit in the first RV.

In each of FIG. 9, FIG. 10, and FIG. 11, an example in which N1 resources are non-consecutive resources in time domain is used to separately describe Manner 1, Manner 2, and Manner 3. Manner 1, Manner 2, and Manner 3 are also applicable to consecutive N1 resources in time domain. Implementation processes are similar, and reference may be made for understanding. For example, referring to (a) in FIG. 12, if the N1 resources are the resource 0, the resource 1, and the resource 2 shown in (b) in FIG. 7, and when the $1^{st}$ bit in the first RV is sent in Manner 3 above, bits sent on each resource are shown in (a) in FIG. 12.

Optionally, if two of the N1 resources that are consecutive in time domain have a same frequency domain resource, a DMRS in the PUSCH is not sent on a resource that is later in time domain in the two resources. An example in which frequency domain resources of the two resources are the same and consecutive in time domain is used for description herein. During actual implementation, if frequency domain resources of more resources in the N1 resources are the same and consecutive in time domain, a quantity of DMRSs sent on the more resources may be set or deleted. For example, a DMRS is sent on the $1^{st}$ resource in the more resources, and no DMRS is sent on other resources. In other words, a DMRS of the $1^{st}$ resource is reused on the other resources. In other words, when data received on the other resources is demodulated, demodulation may be performed based on channel state information measured by the DMRS on the $1^{st}$ resource, so that more resources can be used to send data. This improves resource utilization.

For example, if the N1 resources are the resource 0, the resource 1, and the resource 2 shown in (b) in FIG. 7, frequency domain resources of the resource 0, the resource 1, and the resource 2 are the same. Refer to (a) in FIG. 12. In the conventional technology, the $1^{st}$ symbol of each resource is used to send a DMRS. Refer to (b) in FIG. 12. Because frequency domain resources of the resource 0, the resource 1, and the resource 2 are the same, in this application, a DMRS on the resource 1 may not be sent, and a DMRS sent on the resource 0 is reused. In (b) in FIG. 12, DMRSs may also be sent on the resource 0 and the resource 1, a DMRS on the resource 2 may not be sent, and the DMRS sent on the resource 1 is reused. Refer to (c) in FIG. 12. Because frequency domain resources of the resource 0, the resource 1, and the resource 2 are the same, in this application, DMRSs on the resource 1 and the resource 2 may not be sent, and a DMRS sent on the resource 0 is reused.

Each of FIG. 9 to FIG. 12 in this application is drawn by using an example in which frequency domain resources of the N1 resources are the same. During actual implementation, frequency domain resources of different resources of the N1 resources may be different. In the examples shown in FIG. 9, FIG. 10, FIG. 11, and FIG. 12, an example in which the frequency domain resources of the N1 resources are subcarriers 0 to 3 is used for illustration. However, this is not a limitation on the frequency domain resources of the N1 resources. During actual implementation, the frequency domain resource may be one or more RBs.

Optionally, when a third condition is met, the terminal continuously sends one or more RVs of a PUSCH in a manner of continuously sending RVs (for example, all RVs of the PUSCH are continuously sent). The third condition may be that: a quantity of symbols occupied by the terminal on the PUSCH resource is greater than or equal to (greater than or equal to herein may also be greater than) a third threshold, and/or a number of repetitions indicated by the PUSCH parameter is greater than or equal to (greater than or equal to herein may also be greater than) a fourth threshold. In this case, when the third condition is met, the terminal continuously sends, on the N1 resources, the bits in the first RV. It may be understood that, when a resource in the N1 resources is actually repeated, "a quantity of symbols occupied by the PUSCH resource" in the third condition is number of repetitions*symbol length of nominal repetition. The number of repetitions is equal to a quantity of nominal repetitions.

Generally, a case in which one RV corresponds to a plurality of resources occurs only when the number of repetitions is sufficient and/or the quantity of symbols occupied by the PUSCH resource is sufficient. Therefore, by using the optional method, the method provided in this application may be used to send an RV when necessary, and the method provided in this application may not be used to send an RV when not necessary. This improves sending efficiency.

Optionally, the third threshold is related to a quantity of symbols (that is, L) and a number of repetitions of the PUSCH, and the quantity of symbols and the number of repetitions are indicated by the PUSCH parameter. For example, if L is required to be greater than or equal to 10, and the number of repetitions is required to be greater than or equal to 2, the third threshold may be 10*2=20. The third threshold may also be preset, specified in a protocol, or determined by the terminal and the network device through negotiation. This is not limited in this application.

Optionally, the fourth threshold is related to a quantity of RVs. For example, the fourth threshold may be an upper limit (which is currently 4) of the quantity of RVs. The fourth threshold may also be preset, specified in a protocol, or determined by the terminal and the network device through negotiation. This is not limited in this application. For example, the fourth threshold may be 3 or 4.

607: The network device jointly demodulates bits, received on the N1 resources, in the first RV.

Specifically, the network device combines bits, received on the N1 resources, in the first RVs, and then performs demodulation.

It should be noted that, since bits sent on each of the N1 resources may not necessarily start from the $1^{st}$ bit in the first RV, the network device needs to cooperate with bits sent by the terminal on the N1 resources before demodulation. After receiving a PUSCH on the PUSCH resource, the network device needs to combine, in the received PUSCH based on locations of the N1 resources in the PUSCH resource, bits in the first RV sent on each of the N1 resources, so that the complete first RV can be obtained, and then demodulation can be performed based on the complete first RV.

Optionally, the method further includes: The terminal determines N2 resources based on the PUSCH resource, where the N2 resources are used to send a second RV of the PUSCH. The terminal continuously sends bits in the second RV on the N2 resources, where the N2 resources are located in at least two slots, and N2 is an integer greater than 1. Correspondingly, the network device determines the N2 resources based on the PUSCH resource, the network device receives the bits in the second RV on the N2 resources, and the network device performs joint demodulation on the bits, received on the N2 resources, in the second RV. The second RV is different from the first RV. For example, if the first RV is RV0, the second RV may be RV1, RV2, or RV3. In this method, a process in which the terminal determines N2 resources is similar to a process in which the terminal determines N1 resources, and a process in which the terminal continuously sends a second RV on the N2 resources is similar to a process in which the terminal continuously sends a first RV. Details are not described herein again. A process in which the network device determines N2 resources is similar to that in which the network device determines N1 resources, and a process in which the network device performs joint demodulation on bits in the second RV received on the N2 resources is similar to a process in which the network device performs joint demodulation on bits in the first RV received on the N1 resources. Details are not described herein again.

During actual implementation, the terminal may determine a resource corresponding to each RV, and continuously send bits in the RV on a resource corresponding to the RV. Specifically, the terminal may first divide the PUSCH resource into four resource groups, then determine, based on $rv_{id}$ indicated by DCI, RVs corresponding to the four resource groups, and continuously send a corresponding RV on each resource group. The four resource groups respectively include N1 resources, N2 resources, N3 resources, and N4 resources.

In a first case, resources with a same value obtained by taking a modulo of 4 by the resource index may be classified into one resource group. In this case, resources whose indexes are 4q (where q is an integer greater than or equal to 0) are classified into one resource group, resources whose indexes are 4q+1 are classified into one resource group, resources whose indexes are 4q+2 are classified into one resource group, and resources whose indexes are 4q+3 are classified into one resource group. Based on the resources shown in (a) in FIG. 7, the N1 resources may be a resource 0, a resource 4, and a resource 8, the N2 resources may be a resource 1 and a resource 5, the N3 resources may be a resource 2 and a resource 6, and the N4 resources may be a resource 3 and a resource 7. For example, when $rv_{id}$=0, and an RV cyclic sequence is {0, 2, 3, 1}, N1 resources correspond to RV0, N2 resources correspond to RV2, N3 resources correspond to RV3, and N4 resources correspond to RV1. In this case, the terminal continuously sends RV0 on the N1 resources, continuously sends RV2 on the N2 resources, continuously sends RV3 on the N3 resources, and continuously sends RV1 on the N4 resources. Based on the resources shown in (a) in FIG. 8, the N1 resources may be a resource 0 and a resource 4, the N2 resources may be a resource 1 and a resource 5, the N3 resources may be a resource 2, and the N4 resources may be a resource 3. For example, when $rv_{id}$=0, and an RV cyclic sequence is {0, 2, 3, 1}, N1 resources correspond to RV0, N2 resources correspond to RV2, N3 resources correspond to RV3, and N4 resources correspond to RV1. In this case, the terminal continuously sends RV0 on the N1 resources, continuously sends RV2 on the N2 resources, continuously sends RV3 on the N3 resources, and continuously sends RV1 on the N4 resources.

In a second case, resources that have consecutive indexes and have a same value of $$\left\lfloor \frac{p}{T} \right\rfloor \bmod 4$$

are classified into one resource group. In this case, based on the resources shown in (b) in FIG. 7, the N1 resources may be a resource 0, a resource 1, and a resource 2, the N2 resources may be a resource 3, a resource 4, and a resource 5, the N3 resources may be a resource 6, a resource 7, and a resource 8, and the $4^{th}$ resource group has no resource. For example, when $rv_{id}$=, and an RV cyclic sequence is {0, 2, 3, 1}, N1 resources correspond to RV0, N2 resources correspond to RV2, and N3 resources correspond to RV3. In this case, the terminal continuously sends RV0 on the N1 resources, continuously sends RV2 on the N2 resources, and continuously sends RV3 on the N3 resources. Based on the resources shown in (b) in FIG. 8, the N1 resources may be a resource 0 and a resource 1, the N2 resources may be a resource 2 and a resource 3, the N3 resources may be a resource 4 and a resource 5, and the 4th resource group has no resource. For example, when $rv_{id}$=0, and an RV cyclic sequence is {0, 2, 3, 1}, N1 resources correspond to RV0, N2 resources correspond to RV2, and N3 resources correspond to RV3. In this case, the terminal continuously sends RV0 on the N1 resources, continuously sends RV2 on the N2 resources, and continuously sends RV3 on the N3 resources.

In the second case, it is assumed that each resource group includes T resources. For an RV sent on a resource whose index is p, refer to Table 5.

TABLE 5

| $rv_{id}$ indicated by DCI for scheduling the PUSCH | $rv_{id}$ corresponding to resource whose index is p | | | |
|---|---|---|---|---|
| | $\left\lfloor \frac{p}{T} \right\rfloor$mod4 = 0 | $\left\lfloor \frac{p}{T} \right\rfloor$mod4 = 1 | $\left\lfloor \frac{p}{T} \right\rfloor$mod4 = 2 | $\left\lfloor \frac{p}{T} \right\rfloor$mod4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

During actual implementation, the terminal may continuously send corresponding RVs on some RV resources used to send the PUSCH, or may continuously send corresponding RVs on all RV resources used to send the PUSCH. This is not limited in this application.

In the method provided in Embodiment 1, discrete resources for sending a same RV are integrated, and the first RV is continuously sent on the integrated resource. Compared with the conventional technology in which RVs are sent from scratch on each resource, a terminal can send the complete first RV, which can resolve a problem that an RV is incompletely sent due to resource discreteness of the resources, and improve decoding performance of the network device and reliability of data transmission. If the first RV is RV0, a loss of decoding performance due to incomplete sending of RV0 (that is, missing transmission of a system bit) may be further reduced.

Embodiment 2

Figure 13:
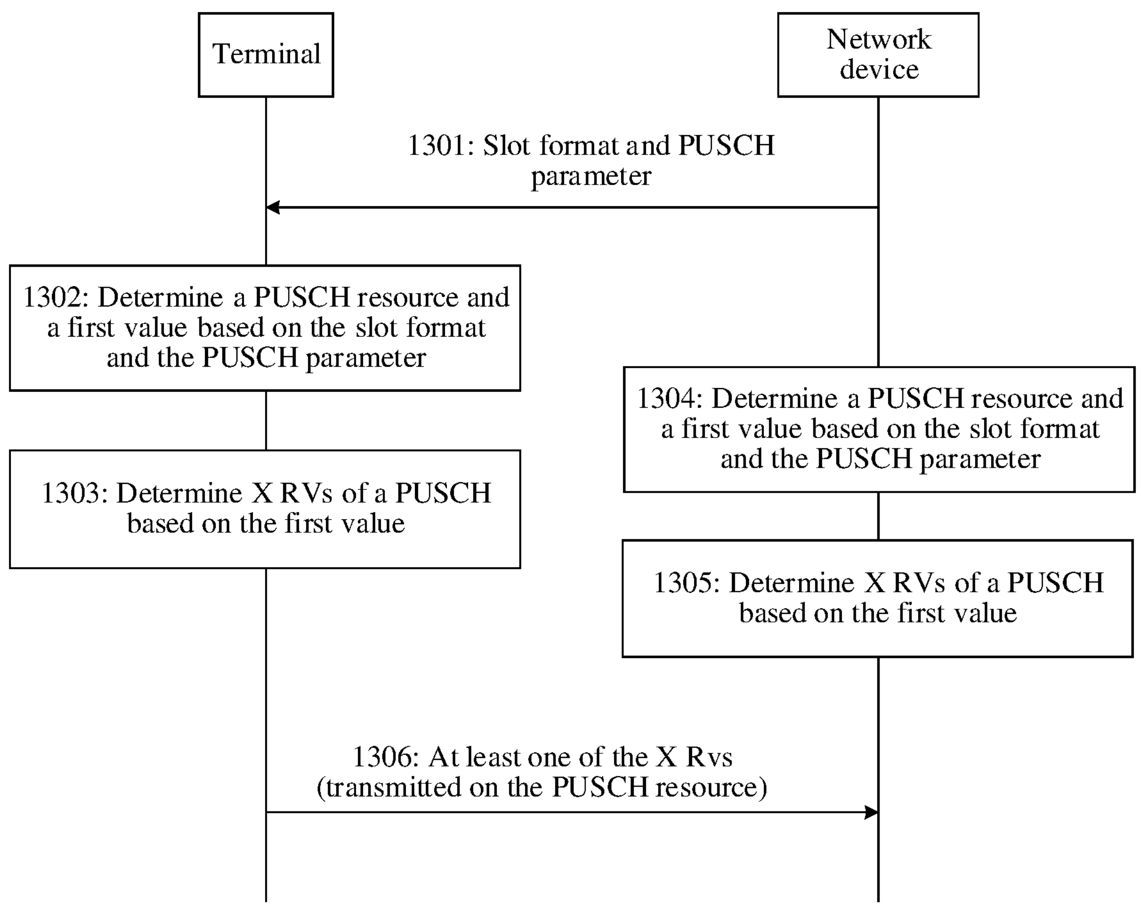
FIG. 13 is another interaction flowchart of a data transmission method according to an embodiment of this application.

Refer to FIG. 13. The method provided in Embodiment 2 includes the following steps.

1301: A network device sends a slot format and a PUSCH parameter to a terminal. Correspondingly, the terminal receives the slot format and the PUSCH parameter from the network device.

For related descriptions of step 1301, refer to step 601. Details are not described herein again.

1302: The terminal determines a PUSCH resource and a first value based on the slot format and the PUSCH parameter.

For related descriptions of determining, by the terminal, a PUSCH resource based on the slot format and the PUSCH parameter in step 1302, refer to step 602. Details are not described herein again.

The first value may be a number of repetitions, or may be a quantity of resources in the PUSCH resource.

1303: The terminal determines X RVs of a PUSCH based on the first value. X is an integer greater than 0. More specifically, X may be an integer greater than 4.

A value of X may have the following three cases:

Case 1: X is the same as the first value. In this case, the first value is less than or equal to an upper limit of a quantity of RVs. For example, if the upper limit of the quantity of RVs is 10, and the first value is 9, X may be 9.

Case 2: X is a value that is greater than the first value and closest to the first value in a plurality of optional values, where the plurality of optional values are preset. For example, if the plurality of optional values are 4, 6, 8, 10, and 12, and the first value is 7, X may be 8.

Case 3: X is a value that is less than the first value and closest to the first value in a plurality of optional values, where the plurality of optional values are preset. For example, if the plurality of optional values are 4, 6, 8, 10, and 12, and the first value is 7, X may be 6.

The plurality of optional values may be specified in a protocol, or may be determined by the terminal and the network device through negotiation. The plurality of optional values may be set in a form of a table.

1304: The network device determines a PUSCH resource and a first value based on the slot format and the PUSCH parameter.

Specific implementation of step 1304 is similar to that of step 1302, and a difference lies only in that step 1304 is performed by the network device. Reference may be made for understanding, and details are not described herein again.

1305: The network device determines X RVs of a PUSCH based on the first value.

Specific implementation of step 1305 is similar to that of step 1303, and a difference lies only in that step 1305 is performed by the network device. Reference may be made for understanding, and details are not described herein again.

It should be noted that, step 1304 and step 1305 may be performed after step 1302 and step 1303, or may be performed before step 1302 and step 1303. This is not limited in this application.

1306: The terminal sends at least one of the X RVs on the PUSCH resource. Correspondingly, the network device receives the at least one of the X RVs on the PUSCH resource.

It should be noted that, after the terminal determines the X RVs, a quantity of resources in the PUSCH may be less than X. In this case, the terminal may send some RVs in the X RVs on the PUSCH resource.

Figure 14:
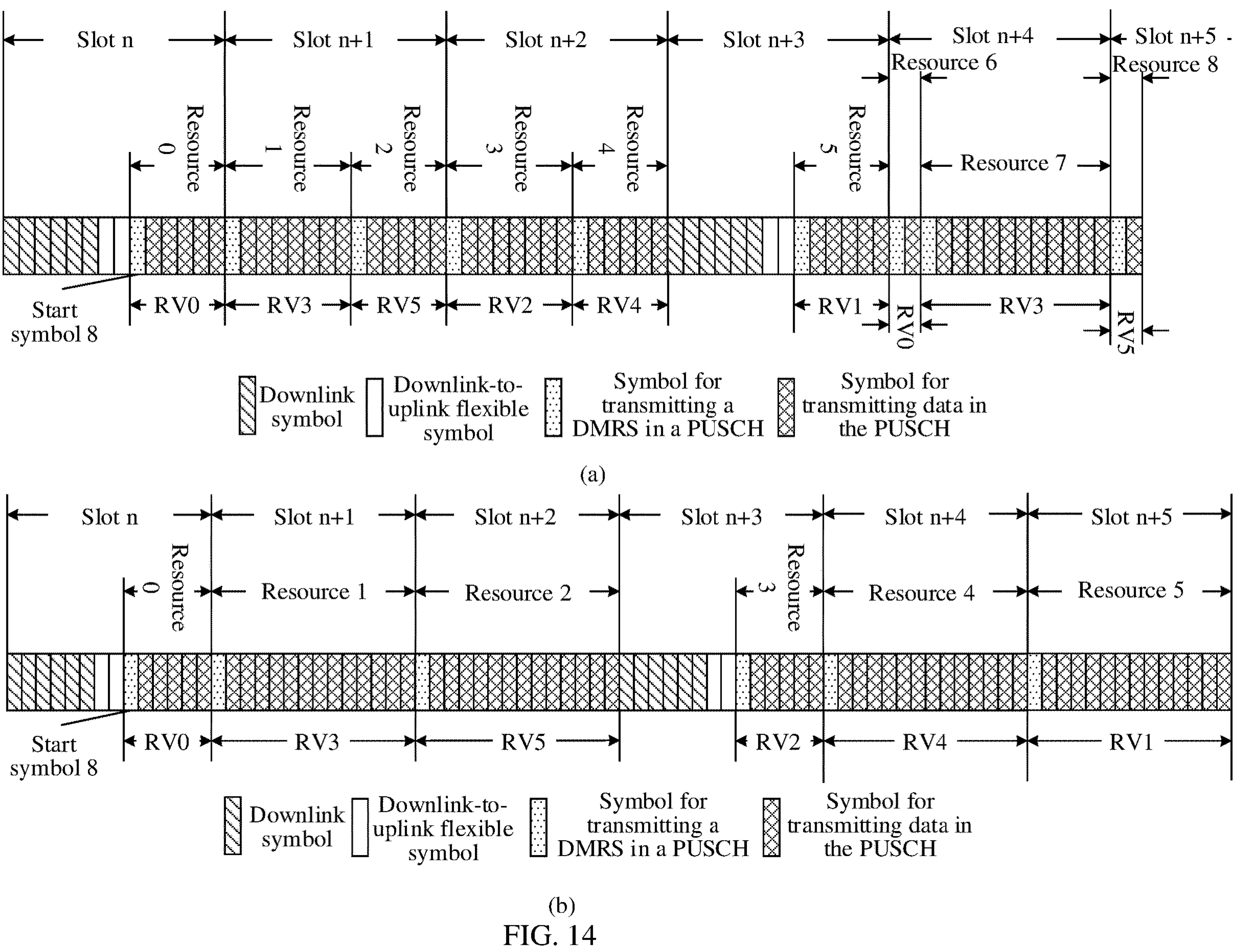
FIG. 14 is still another schematic diagram of a resource and an RV sent on the resource according to an embodiment of this application.

Optionally, after step 1303, the method further includes: The terminal determines a cyclic sequence of the X RVs. In this case, during specific implementation of step 1306, the terminal sends the X RVs on the PUSCH resource in the cyclic sequence of the X RVs. For example, if X=6, six RVs are respectively RV0, RV1, RV2, RV3, RV4, and RV5, and a cyclic sequence of the six RVs may be RV0, RV3, RV5, RV2, RV4, and RV1. In this case, for an RV sent on each resource shown in (a) in FIG. 7, refer to (a) in FIG. 14, and for an RV sent on each resource shown in (a) in FIG. 8, refer to (b) in FIG. 14.

During specific implementation, each of the plurality of optional values may correspond to a table similar to Table 4, $rv_{id}$ indicated by DCI and the table may show a cyclic sequence of RVs. For example, for a table corresponding to 8 in the optional values, refer to Table 6.

TABLE 6

| $rv_{id}$ indicated by DCI for scheduling the PUSCH | $rv_{id}$ corresponding to resource whose index is p | | | | | | | |
|---|---|---|---|---|---|---|---|---|
| | p mod 8 = 0 | p mod 8 = 1 | p mod 8 = 2 | p mod 8 = 3 | p mod 8 = 4 | p mod 8 = 5 | p mod 8 = 6 | p mod 8 = 7 |
| 0 | 0 | 2 | 3 | 1 | 4 | 6 | 7 | 5 |
| 2 | 2 | 3 | 1 | 4 | 6 | 7 | 5 | 0 |
| 3 | 3 | 1 | 4 | 6 | 7 | 5 | 0 | 2 |
| 1 | 1 | 4 | 6 | 7 | 5 | 0 | 2 | 3 |
| 4 | 4 | 6 | 7 | 5 | 0 | 2 | 3 | 1 |
| 6 | 6 | 7 | 5 | 0 | 2 | 3 | 1 | 4 |
| 7 | 7 | 5 | 0 | 2 | 3 | 1 | 4 | 6 |
| 5 | 5 | 0 | 2 | 3 | 1 | 4 | 6 | 7 |

In the current technology, a terminal can cyclically send only RV1, RV2, RV3, and RV1 of a PUSCH. In Embodiment 2, more RVs (that is, more than four RVs) are introduced, a quantity of RVs is determined based on a quantity of resources or a number of repetitions in a PUSCH resource, and more RVs are sent on the resource, so that different resources carry different RVs as much as possible, a problem that a same RV is repeatedly sent on the resource due to a relatively small quantity of RVs is alleviated, integrity of system bit sending is improved as much as possible, and a loss of decoding performance caused by incomplete system bit sending due to discrete resources is reduced.

Embodiment 3

Figure 15:
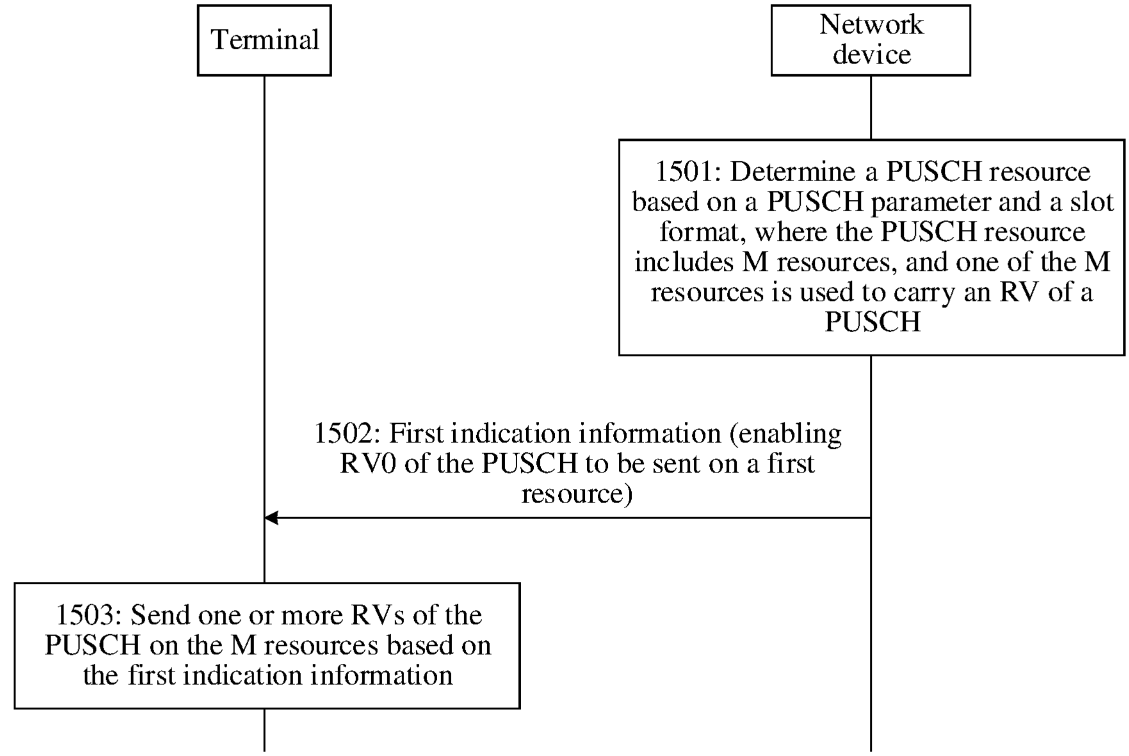
FIG. 15 is still another interaction flowchart of a data transmission method according to an embodiment of this application.

Refer to FIG. 15. The method provided in Embodiment 3 includes the following steps.

1501: A network device determines a PUSCH resource based on a PUSCH parameter and a slot format, where the PUSCH resource includes M resources, and one of the M resources is used to carry an RV of a PUSCH.

All resources in the PUSCH resource may be M resources. For a process in which the network device determines resources (that is, the M resources) in the PUSCH resource, refer to step 1302 for understanding, and a difference lies only in that step 1501 is performed by the network device. For example, in the examples shown in (a) in FIG. 7 and (b) in FIG. 7, the M resources are the resource 0 to the resource 8. In the examples shown in (a) in FIG. 8 and (b) in FIG. 8, the M resources are the resource 0 to the resource 5.

1502: The network device sends first indication information to a terminal, so that a first RV of a PUSCH is sent on a first resource, where the first RV is an RV whose index is 0 (that is, the first RV is RV0). Correspondingly, the terminal receives the first indication information from the network device.

The first indication information indicates an RV of the PUSCH that is sent on the first resource in the M resources, that is, the first indication information indicates $rv_{id}$ indicated by the DCI. The first indication information may be carried in the DCI.

The first resource may have the following two cases:

Case 1: The first resource is a resource with a largest quantity of symbols in the M resources. Specifically, the first resource may be a resource that includes a largest quantity of all symbols in the M resources, or may be a resource that includes a largest quantity of symbols used to send data in the M resources. The former is used as an example. Based on the resources shown in (a) in FIG. 7, the M resources are nine resources, and the resource 7 is a resource that includes a largest quantity of symbols in the nine resources. In this case, the first resource is the resource 7. Using an example in which an RV cyclic sequence is {1, 2, 3, 1}, based on Table 4, $rv_{id}$ indicated by the first indication information is 2.

Case 2: The first resource is a resource with a largest quantity of symbols in resources used to send a same RV in the M resources. The resources used to send a same RV include the resource groups determined in the first case or the second case in Embodiment 1.

Figure 16:
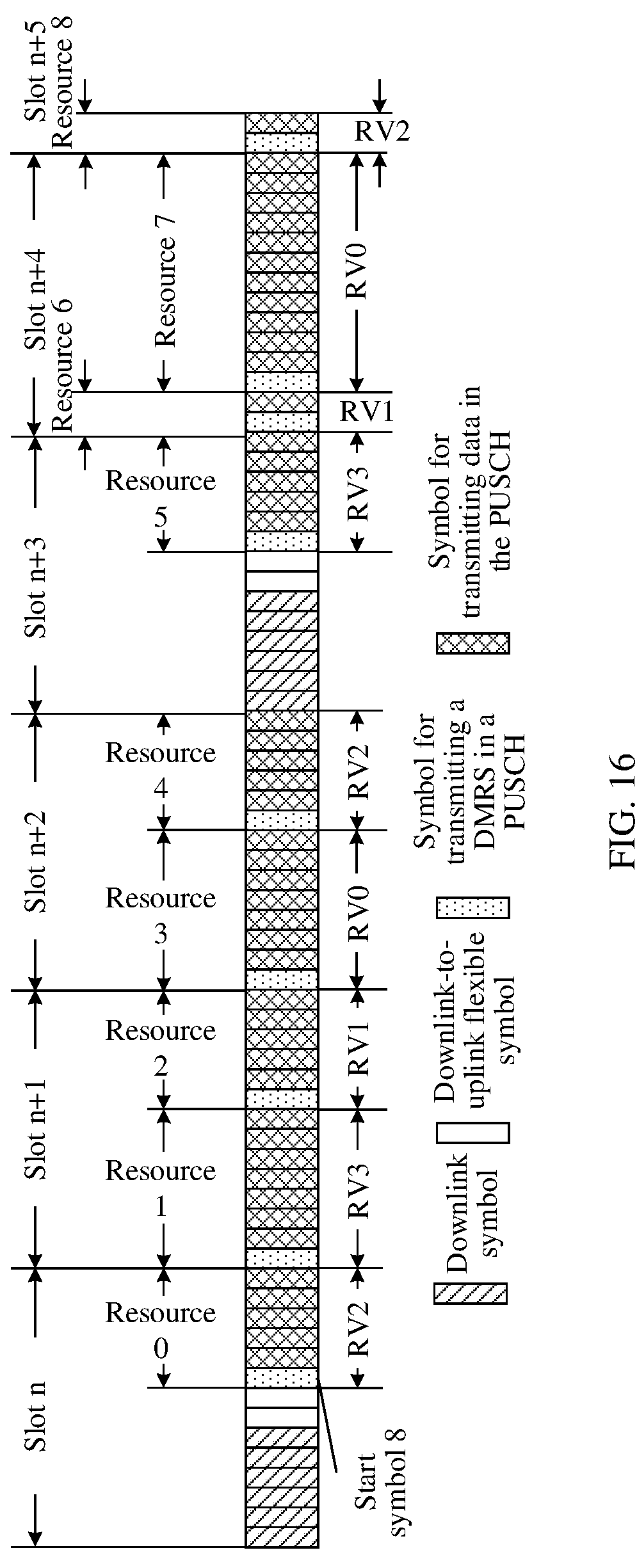
FIG. 16 is yet another schematic diagram of a resource and an RV sent on the resource according to an embodiment of this application.

In Case 1, the quantity of symbols in resources used to send a same RV may be a quantity of all symbols in the resources, or may be a quantity of symbols used to send data in the resources. The former is used as an example. Refer to FIG. 16. A resource 0, a resource 4, and a resource 8 form a resource group used to send a same RV, and a quantity of symbols included in the resource group is 14. A resource 1 and a resource 5 form a resource group used to send a same RV, and a quantity of symbols included in the resource group is 14. A resource 2 and a resource 6 form a resource group used to send a same RV, and a quantity of symbols included in the resource group is 8. A resource 3 and a resource 7 form a resource group used to send a same RV, and a quantity of symbols included in the resource group is 20. The resource group including the resource 3 and the resource 7 has a largest quantity of symbols. Therefore, the first resource is a resource group including the resource 3 and the resource 7. The terminal sends RV0 on the resource 3 and the resource 7. Using an example in which an RV cyclic sequence is {0, 2, 3, 1}, based on Table 4, $rv_{id}$ indicated by the first indication information is 2.

Figure 17:
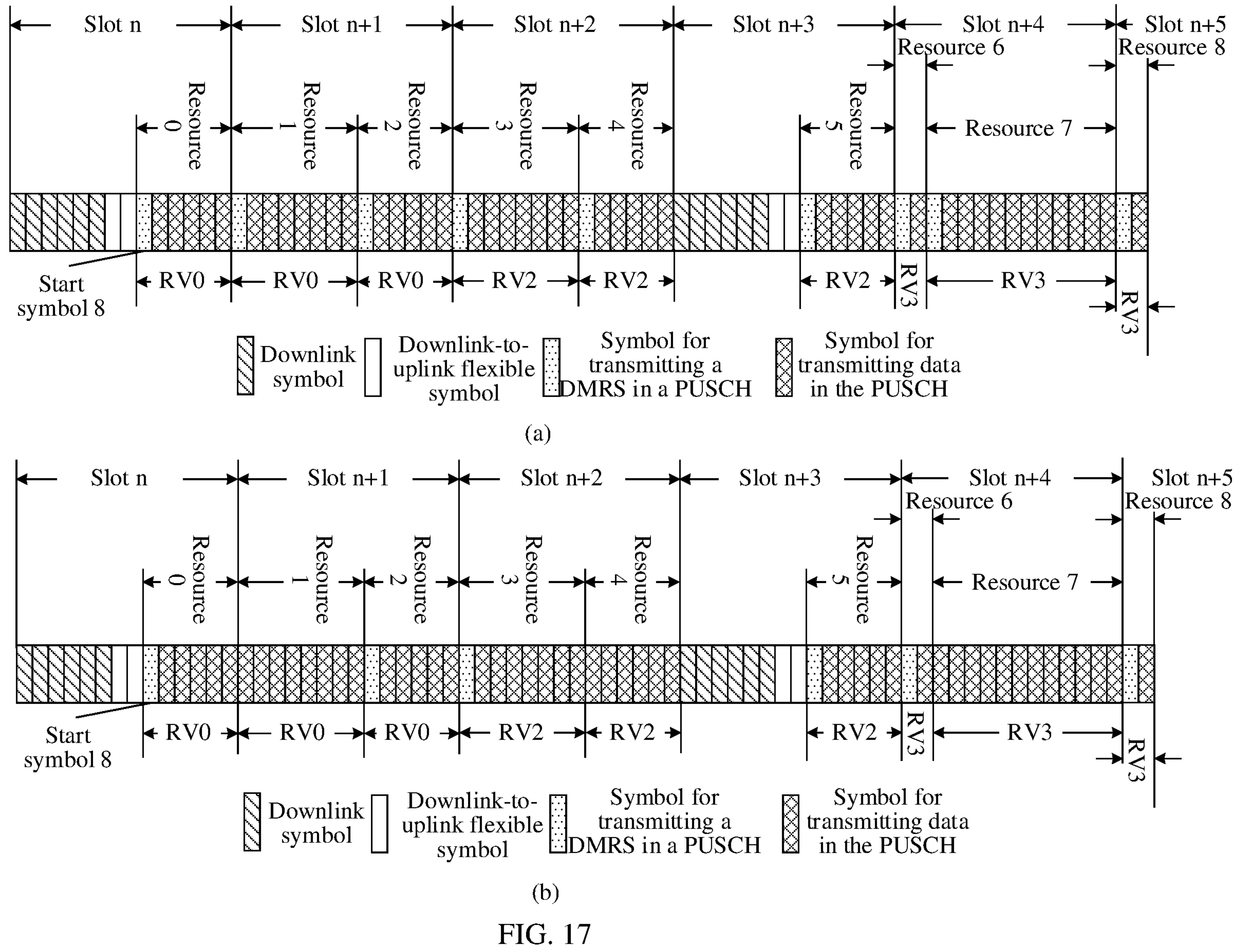
FIG. 17 is still yet another schematic diagram of a resource and an RV sent on the resource according to an embodiment of this application.

In Case 2, some resources may reuse DMRSs of other resources, and the quantity of symbols in resources used to send a same RV may be a quantity of all symbols in the resources, or may be a quantity of symbols used to send data in the resources. The former is used as an example. Refer to (a) in FIG. 17. A resource 0, a resource 1, and a resource 2 form a resource group used to send a same RV, and a quantity of symbols included in the resource group is 20. A resource 3, a resource 4, and a resource 5 form a resource group used to send a same RV, and a quantity of symbols included in the resource group is 20. A resource 6, a resource 7, and a resource 8 form a resource group used to send a same RV, and a quantity of symbols included in the resource group is 16. Therefore, the first resource is a resource group including the resource 0, the resource 1, and the resource 2, or is a resource group including the resource 3, the resource 4, and the resource 5. The terminal sends RV0 on the resource 0, the resource 1, and the resource 2 (for example, as shown in (a) in FIG. 17), or the terminal sends RV0 on the resource 3, the resource 4, and the resource 5. Using an example in which the RV cyclic sequence is {0, 2, 3, 1}, based on Table 4, when the terminal sends RV0 on the resource 0, the resource 1, and the resource 2, $rv_{id}$ indicated by the first indication information is 0. When the terminal sends RV0 on the resource 3, the resource 4, and the resource 5, $rv_{id}$ indicated by the first indication information is 1. The latter is used as an example. Refer to (b) in FIG. 17. A resource 0, a resource 1, and a resource 2 form a resource group used to send a same RV, the resource 1 reuses a DMRS of the resources 0, and a quantity of symbols used to send data in the resource group is 18. A resource 3, a resource 4, and a resource 5 form a resource group used to send a same RV, the resource 4 reuses a DMRS of the resource 3, and a quantity of symbols used to send data in the resource group is 18. A resource 6, a resource 7, and a resource 8 form a resource group used to send a same RV, the resource 7 reuses a DMRS of the resources 6, and a quantity of symbols used to send data in the resource group is 14. Therefore, the first resource is a resource group including the resource 0, the resource 1, and the resource 2, or is a resource group including the resource 3, the resource 4, and the resource 5. The terminal sends RV0 on the resource 0, the resource 1, and the resource 2 (for example, as shown in (b) in FIG. 17), or the terminal sends RV0 on the resource 3, the resource 4, and the resource 5. Using an example in which the RV cyclic sequence is {0, 2, 3, 1}, based on Table 4, when the terminal sends RV0 on the resource 0, the resource 1, and the resource 2, $rv_{id}$ indicated by the first indication information is 0. When the terminal sends RV0 on the resource 3, the resource 4, and the resource 5, $rv_{id}$ indicated by the first indication information is 1.

1503: The terminal sends one or more RVs of the PUSCH on the M resources based on the first indication information.

During specific implementation of step 1503, the terminal may determine, based on $rv_{id}$ indicated by the first indication information, an RV corresponding to each of the M resources, and send the corresponding RV on each of the M resources.

Before step 1503, the method may further include step 601 and step 602. Further, the terminal may determine M resources, so as to send one or more RVs of the PUSCH on the M resources. In this case, step 601 and step 602 may be performed before step 1501 or step 1502, or may be performed after step 1501 or step 1502. This is not limited in this application.

Optionally, before step 1502, the method further includes:

(11) The network device determines that all k values of the first indication information enable the first RV of the PUSCH to be sent on the first resource, where k is an integer greater than 1.

(12) The network device determines, based on the k values, that lengths of resources occupied by a second RV are respectively L1, L2, . . . , and Lk, where the second RV is an RV whose index is 1 or 3.

(13) When the first indication information is a first value in the k values, the second RV is sent on a second resource, and the network device determines that the first value in the k values is a value of the first indication information. The second resource is a resource occupied by the second RV and whose length is Lmax, and Lmax is a largest value in L1, L2, . . . , and Lk.

It should be noted that, during actual implementation, there may be a plurality of resources with a largest quantity of symbols (that is, there may be a plurality of first resources). In this case, the first indication information may have a plurality of values, so that RV0 can be sent on the resource with the largest quantity of symbols. In this case, since RV1 and RV3 include more system bits than RV2, on a premise that RV0 is sent on the resource with the largest quantity of symbols, RV1 or RV3 may be sent on a resource with a relatively large quantity of symbols. In this way, a complete system bit is sent as much as possible, and performance is improved.

When the first resource is a resource with a largest quantity of symbols in the M resources, for one of the k values, the second RV may occupy a plurality of resources. In this case, a resource with a largest quantity of symbols in the plurality of resources occupied by the second RV is considered as a resource occupied by the second RV in step (12). For example, based on the resources shown in (a) in FIG. 8, the first resource may be a resource 1, a resource 2, a resource 4, or a resource 5, and based on Table 4, $rv_{id}$ may be 3, 0, or 1. It is assumed that the second RV is RV1, and when $rv_{id}$ indicated by the first indication information is 1, the first resource is the resource 1 or the resource 5, and the second resource is the resource 0 or the resource 4. Because a quantity of symbols of the resource 4 is greater than a quantity of symbols of the resource 0, it is considered that a resource occupied by the second RV is the resource 4. When $rv_{id}$ indicated by the first indication information is 3, the first resource is the resource 2, and the second resource is the resource 1 or the resource 5. Because the resource 1 and the resource 5 have a same quantity of symbols, a resource occupied by the second resource may be the resource 1, or may be the resource 5. When $rv_{id}$ indicated by the first indication information is 0, the first resource is the resource 4, and the second resource is the resource 3. As can be learned from the above, when $rv_{id}$=1 and $rv_{id}$=3, a quantity of symbols of the resource occupied by the second RV is 14; and when $rv_{id}$=0, the quantity of symbols of the resource occupied by the second RV is 6. In this case, $rv_{id}$ indicated by the first indication information may be 1 or 3. Further, when $rv_{id}$ indicated by the first indication information is 3, a resource occupied by RV3 includes the resource 4. When $rv_{id}$ indicated by the first indication information is 1, a resource occupied by RV3 is the resource 3. A quantity of symbols of the resource 4 is greater than a quantity of symbols of the resource 3. Based on a principle of ensuring that RV3 is also sent on a relatively long resource, $rv_{id}$ indicated by the first indication information may be 3.

When the first resource is the resource with a largest quantity of symbols in resources used to send a same RV in the M resources, the resource occupied by the second RV in step (12) is a resource used to send the second RV. For example (denoted as Example 1), it is assumed that a plurality of resources with consecutive resource indexes are classified into one resource group for sending a same RV, and each resource group includes T (assuming that T=3) resources, and an index of the resource is denoted as p. In this case, the 1st resource group includes resources corresponding to $$\left\lfloor \frac{p}{T} \right\rfloor \mathrm{mod}_{4=0}$$

(that is, a resource 0, a resource 1, and a resource 2), and the 2nd resource group includes resources corresponding to $$\left\lfloor \frac{p}{T} \right\rfloor \mathrm{mod}_{4=1}$$

(that is, a resource 3, a resource 4, and a resource 5), the 3rd resource group includes resources corresponding to $$\left\lfloor \frac{p}{T} \right\rfloor \mathrm{mod}_{4=2}$$

that is, a resource 0, a resource 7, and a resource 8), and the 4th resource group includes resources corresponding to $$\left\lfloor \frac{p}{T} \right\rfloor \mathrm{mod}_{4=3}$$

(that is, a resource 9, a resource 10, and a resource 11). Total quantities of symbols of the 1st resource group, the 2nd resource group, the 3rd resource group, and the 4th resource group are respectively 20, 20, 16, and 14. In this case, RV0 may be sent on the 1st resource group (in this case, $rv_{id}$=0), or may be sent on the 2nd resource group (in this case, $rv_{id}$=1). It is assumed that the second RV is RV1. When $rv_{id}$=0, RV1 is sent on the 4th resource group; and when $rv_{id}$=1, RV1 is sent on the 1st resource group. The total quantity of symbols (that is, 20) of the 1st resource group is greater than a quantity of symbols (that is, 14) of the 4th resource group. That is, $rv_{id}$=0 and $rv_{id}$=1 are compared, $rv_{id}$=1 may enable the second RV to occupy a larger quantity of symbols. Therefore, it is determined that $rv_{id}$=1.

In the method provided in Embodiment 3, since RV0 includes a largest quantity of system bits, the network device may schedule to enable the terminal to send RV0 on a resource with a largest quantity of symbols, so that more system bits are received as much as possible. This improves decoding performance. Further, when there are a plurality of resources with a maximum quantity of symbols, the terminal may further send RV1 or RV3 on the resource with a relatively large quantity of symbols as much as possible while ensuring that RV0 is sent on the resource with the maximum quantity of symbols, so that the network device further receives more system bits. This improves decoding performance.

In the foregoing embodiments, the cyclic sequence of the RVs is not limited, and is not limited to the cyclic sequence shown in Table 4. The cyclic sequence of the RVs may be indicated by using more than 2 bits. For example, when the RVs include RV0, RV1, RV2, and RV3, the RVs have 24 possible cyclic sequences. In this case, 5 bits may be used to indicate 24 cyclic sequences of the four RVs. Description is similar when the quantity of RVs is greater than 4, and details are not described herein again.

The embodiments mentioned above in this application may be combined without conflicting solutions. This is not limited in this application. For example, in Embodiment 1, more RVs may also be configured, resources corresponding to these RVs may be determined, and the RV is continuously sent on a resource corresponding to each RV, or RV0 is sent on a resource group with a largest quantity of symbols in the determined plurality of resource groups. In another example, in Embodiment 2, RV0 in more RVs may also be sent on a resource with a largest quantity of symbols.

In the foregoing embodiments of this application and the corresponding accompanying drawings, an example in which a DMRS in a PUSCH occupies one symbol is used to describe the PUSCH sent in this application. During actual implementation, the DMRS may occupy more symbols in the PUSCH, for example, two, three, four, or the like. This is not limited in this application. In addition, there may be a downlink slot between slots shown in the accompanying drawings of this application (for example, the slot n+2 and the slot n+3 in FIG. 1). Because this application does not involve sending data in the downlink slot, this is not shown in the accompanying drawings. However, it should be understood that each slot shown in the accompanying drawings of this application is an example, and does not limit a slot format and a slot location during actual implementation.

When indicating the start symbol S, the quantity L of symbols, and $K_2$, the PUSCH parameter in the foregoing embodiments of this application may not indicate one index, but directly indicate one or more of the start symbol S, the symbol quantity L, and $K_2$. This is not limited in this application.

The solutions provided in embodiments of this application are mainly described above from a perspective of a method. It may be understood that, to implement the foregoing functions, each network element, for example, a terminal and a network device, include at least one of a corresponding hardware structure and a corresponding software module that are configured to perform the functions. A person skilled in the art should be easily aware that, in combination with the units and algorithm steps of the examples described in the embodiments disclosed in this specification, this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the scope of this application.

In embodiments of this application, functional units of the terminal and the network device may be divided based on the foregoing method examples. For example, the functional units may be divided based on corresponding functions, or two or more functions may be integrated into one processing unit. The integrated unit may be implemented in a form of hardware, or may be implemented in a form of a software functional unit. It should be noted that, unit division in embodiments of this application is an example, and is merely division of logical functions. During actual implementation, there may be another division manner.

Figures 18, 19, 20:
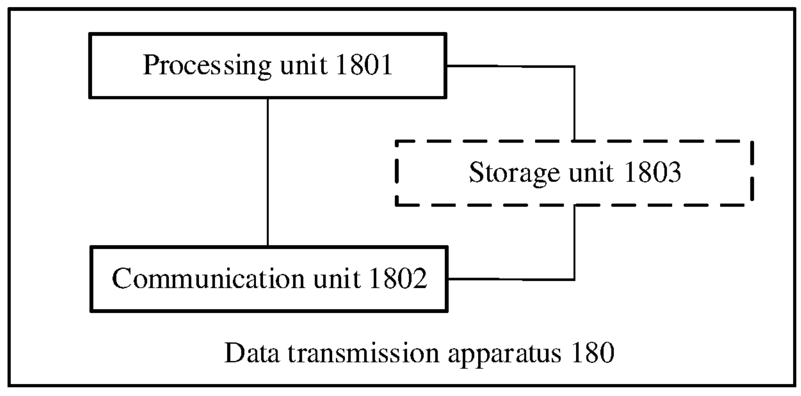
FIG. 18 is a schematic composition diagram of a data transmission apparatus according to an embodiment of this application.
FIG. 19 is a schematic diagram of a hardware structure of a data transmission apparatus according to an embodiment of this application.
FIG. 20 is another schematic diagram of a hardware structure of a data transmission apparatus according to an embodiment of this application.

For example, FIG. 18 is a possible schematic diagram of a structure of a data transmission apparatus (denoted as a data transmission apparatus 180) in the foregoing embodiments. The data transmission apparatus 180 includes a processing unit 1801 and a communication unit 1802. Optionally, the data transmission apparatus 180 further includes a storage unit 1803. The data transmission apparatus 180 may be configured to illustrate structures of the terminal and the network device in the foregoing embodiments.

When the data transmission apparatus 180 is used to illustrate the structure of the terminal in the foregoing embodiments, the processing unit 1801 is configured to control and manage actions of the terminal. For example, the processing unit 1801 is configured to perform steps 601, 602, 603, and 606 in FIG. 6, steps 1301, 1302, 1303, and 1306 in FIG. 13, steps 1502 and 1503 in FIG. 15, and/or actions performed by the terminal in another process described in embodiments of this application. The processing unit 1801 may communicate with another network entity through the communication unit 1802, for example, communicate with the network device in FIG. 6. The storage unit 1803 is configured to store program code and data of the terminal.

When the data transmission apparatus 180 is used to illustrate the structure of the network device in the foregoing embodiments, the processing unit 1801 is configured to control and manage actions of the network device. For example, the processing unit 1801 is configured to perform steps 601, 604, 605, 606, and 607 in FIG. 6, steps 1301, 1304, 1305, and 1306 in FIG. 13, steps 1501 and 1502 in FIG. 15, and/or actions performed by the network device in another process described in embodiments of this application. The processing unit 1801 may communicate with another network entity through the communication unit 1802, for example, communicate with the terminal in FIG. 6. The storage unit 1803 is configured to store program code and data of the network device.

For example, the data transmission apparatus 180 may be a device, or may be a chip or a chip system.

When the data transmission apparatus 180 is a device, the processing unit 1801 may be a processor, and the communication unit 1802 may be a communication interface, a transceiver, or an input interface and/or an output interface. Optionally, the transceiver may be a transceiver circuit. Optionally, the input interface may be an input circuit, and the output interface may be an output circuit.

When the data transmission apparatus 180 is a chip or a chip system, the communication unit 1802 may be a communication interface, an input interface and/or an output interface, an interface circuit, an output circuit, an input circuit, a pin, a related circuit, or the like on the chip or the chip system. The processing unit 1801 may be a processor, a processing circuit, a logic circuit, or the like.

When the integrated unit in FIG. 18 is implemented in a form of a software functional module and is sold or used as an independent product, the integrated unit may be stored in a computer-readable storage medium. Based on such an understanding, the technical solutions of embodiments of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in embodiments of this application. The foregoing storage medium for storing the computer software product includes: any medium that can store program code, such as a USB flash drive, a removable hard disk, a read-only memory (read-only memory, ROM), a random access memory (random access memory, RAM), a magnetic disk or an optical disc.

An embodiment of this application further provides a schematic diagram of a hardware structure of a data transmission apparatus. Refer to FIG. 19 or FIG. 20. The data transmission apparatus includes a processor 1901, and optionally, further includes a memory 1902 connected to the processor 1901.

The processor 1901 may be a general-purpose central processing unit (central processing unit, CPU), a microprocessor, an application-specific integrated circuit (application-specific integrated circuit, ASIC), or one or more integrated circuits configured to control program execution of the solutions in this application. Alternatively, the processor 1901 may include a plurality of CPUs, and the processor 1901 may be a single-core (single-CPU) processor, or may be a multi-core (multi-CPU) processor. The processor herein may be one or more devices, circuits, or processing cores configured to process data (for example, computer-executable instructions).

The memory 1902 may be a ROM or a static storage device of another type that can store static information and computer-executable instructions, a RAM or a dynamic storage device of another type that can store information and computer-executable instructions, or an electrically erasable programmable read-only memory (electrically erasable programmable read-only memory, EEPROM), a compact disc read-only memory (CD-ROM) or other optical disk storage, optical disk storage (including a compact disc, a laser disc, an optical disc, a digital versatile disc, a Blu-ray disc, and the like), a magnetic disk storage medium, or another magnetic storage device, or any other medium that can be configured to carry or store expected program code in a form of an instruction or a data structure and that can be accessed by a computer. This is not limited in embodiments of this application. The memory 1902 may independently exist (where in this case, the memory 1902 may be located outside the data transmission apparatus, or may be located inside the data transmission apparatus), or may be integrated with the processor 1901. The memory 1902 may include computer program code. The processor 1901 is configured to execute the computer program code stored in the memory 1902, to implement the method provided in embodiments of this application.

In a first possible implementation, referring to FIG. 19, the data transmission apparatus further includes a transceiver 1903. The processor 1901, the memory 1902, and the transceiver 1903 are connected through a bus. The transceiver 1903 is configured to communicate with another device or a communication network. Optionally, the transceiver 1903 may include a transmitter and a receiver. A component that is in the transceiver 1903 and that is configured to implement a receiving function may be considered as a receiver, and the receiver is configured to perform receiving steps in embodiments of this application. A component that is configured to implement a sending function in the transceiver 1903 may be considered as a transmitter, and the transmitter is configured to perform sending steps in embodiments of this application.

Based on the first possible implementation, the schematic diagram of a structure shown in FIG. 19 may be used to illustrate structures of the terminal and the network device in the foregoing embodiments.

When the schematic diagram of a structure shown in FIG. 19 is used to illustrate the structure of the terminal in the foregoing embodiments, the processor 1901 is configured to control and manage actions of the terminal. For example, the processor 1901 is configured to perform steps 601, 602, 603, and 606 in FIG. 6, steps 1301, 1302, 1303, and 1306 in FIG. 13, steps 1502 and 1503 in FIG. 15, and/or actions performed by the terminal in another process described in embodiments of this application. The processor 1901 may communicate with another network entity through the transceiver 1903, for example, communicate with the network device in FIG. 6. The memory 1902 is configured to store program code and data of the terminal.

When the schematic diagram of a structure shown in FIG. 19 is used to illustrate the structure of the network device in the foregoing embodiments, the processor 1901 is configured to control and manage actions of the network device. For example, the processor 1901 is configured to perform steps 601, 604, 605, 606, and 607 in FIG. 6, steps 1301, 1304, 1305, and 1306 in FIG. 13, steps 1501 and 1502 in FIG. 15, and/or actions performed by the network device in another process described in embodiments of this application. The processor 1901 may communicate with another network entity through the transceiver 1903, for example, communicate with the terminal in FIG. 6. The memory 1902 is configured to store program code and data of the network device.

In a second possible implementation, the processor 1901 includes a logic circuit and an input interface and/or an output interface. For example, the output interface is configured to perform a sending action in a corresponding method, and the input interface is configured to perform a receiving action in a corresponding method. Based on the second possible implementation, referring to FIG. 20, the schematic diagram of a structure shown in FIG. 20 may be used to illustrate structures of the terminal and the network device in the foregoing embodiments.

When the schematic diagram of a structure shown in FIG. 20 is used to illustrate the structure of the terminal in the foregoing embodiments, the processor 1901 is configured to control and manage actions of the terminal. For example, the processor 1901 is configured to perform steps 601, 602, 603, and 606 in FIG. 6, steps 1301, 1302, 1303, and 1306 in FIG. 13, steps 1502 and 1503 in FIG. 15, and/or actions performed by the terminal in another process described in embodiments of this application. The processor 1901 may communicate with another network entity through the input interface and/or the output interface, for example, communicate with the network device in FIG. 6. The memory 1902 is configured to store program code and data of the terminal.

When the schematic diagram of a structure shown in FIG. 20 is used to illustrate the structure of the network device in the foregoing embodiments, the processor 1901 is configured to control and manage actions of the network device. For example, the processor 1901 is configured to perform steps 601, 604, 605, 606, and 607 in FIG. 6, steps 1301, 1304, 1305, and 1306 in FIG. 13, steps 1501 and 1502 in FIG. 15, and/or actions performed by the network device in another process described in embodiments of this application. The processor 1901 may communicate with another network entity through the input interface and/or the output interface, for example, communicate with the terminal in FIG. 6. The memory 1902 is configured to store program code and data of the network device.

During implementation, the steps in the method provided in embodiments may be completed by using an integrated logic circuit of hardware in the processor or instructions in a form of software. The steps of the methods disclosed with reference to embodiments of this application may be directly performed and completed by a hardware processor, or may be performed and completed by using a combination of hardware and software modules in the processor.

An embodiment of this application further provides a computer-readable storage medium, including computer-executable instructions. When the computer-executable instructions are run on a computer, the computer is enabled to perform any one of the foregoing methods.

An embodiment of this application further provides a computer program product including computer-executable instructions. When the computer program product is run on a computer, the computer is enabled to perform any one of the foregoing methods.

An embodiment of this application further provides a communication system, including the network device and the terminal in the foregoing embodiments.

An embodiment of this application further provides a chip, including a processor and an interface. The processor is coupled to a memory by using the interface. When the processor executes a computer-executable program or computer-executable instructions in the memory, any method provided in the foregoing embodiments is performed.

The computer-executable instructions in this application may also be referred to as instructions, computer instructions, a computer program, or the like.

All or some of the foregoing embodiments may be implemented by using software, hardware, firmware, or any combination thereof. When a software program is used for implementation, all or some of the embodiments may be implemented in a form of a computer program product. The computer program product includes one or more computer-executable instructions. When the computer-executable instructions are loaded and executed on a computer, all or some of the processors or functions according to embodiments of this application are generated. The computer may be a general-purpose computer, a special-purpose computer, a computer network, or another programmable apparatus. The computer-executable instructions may be stored in a computer-readable storage medium, or transmitted from one computer-readable storage medium to another computer-readable storage medium. For example, the computer-executable instructions may be transmitted from one website, computer, server or data center to another website, computer, server or data center in a wired (for example, a coaxial cable, an optical fiber or a digital subscriber line (digital subscriber line, DSL)) or wireless (for example, infrared, wireless or microwave) manner. The computer-readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described herein with reference to the embodiments, in a process of implementing the claimed application, a person skilled in the art may understand and implement other variations of the disclosed embodiments by viewing the accompanying drawings, disclosed content, and the claims. In the claims, the term "comprising" (comprising) does not exclude other components or steps, and the term "a" or "an" does not exclude a case of a plurality of components. A single processor or another unit may perform several functions enumerated in the claims. The fact that specific measures are recorded in mutually different dependent claims does not mean that these measures cannot be combined to produce a good effect.

Although this application has been described with reference to specific features and the embodiments, it is obvious that various modifications and combinations may be made to this application without departing from the spirit and scope of this application. Correspondingly, the specification and the accompanying drawings are merely example descriptions of this application defined by the following claims, and are deemed to have covered any and all modifications, variations, combinations, or equivalents that fall within the scope of this application. It is clear that, a person skilled in the art may make various modifications and variations to this application without departing from the spirit and scope of this application. Therefore, if the modifications and variations made to this application fall within the scope of the claims of this application and their equivalent technologies, this application is intended to include these modifications and variations.

What is claimed is:

1. A data transmission method, performed by a terminal device or performed by a chip, the method comprising:

determining N1 slots based on a physical uplink shared channel (PUSCH) resource, wherein the N1 slots are allocated for the terminal device to send a first redundancy version (RV) of a PUSCH, and N1 is an integer greater than 1;

sending an initial bit in the first RV on a second slot when a last bit in the first RV is sent on a last bit of a first slot, wherein the first slot is a $(n1)^{th}$ slot in the N1 slots, the second slot is a $(n1+1)^{th}$ slot in the N1 slots, and n1=1, 2, . . . , or N1−1; and continuously sending bits in the first RV when a last bit sent on the first slot is not the last bit in the first RV, wherein the last bit transmitted on the first slot and the first bit transmitted on the second slot are two adjacent bits in the first RV, and the last bit transmitted on the first slot is the bit in the first RV preceding the first bit transmitted on the second slot.

2. The method of claim 1, wherein the method further comprises:

determining the $i^{th}$ slot in the PUSCH resource based on m allocated for sending bits in the first RV, wherein $$m = \left\lfloor \frac{p}{N_1} \right\rfloor \bmod 4,$$

p is an index of the $i^{th}$ slot, N1 is the number of slots allocated to send bits in the first RV, and i=1, 2, . . . , or N1−1.

3. The method of claim 2, wherein the method further comprises:

receiving first downlink control information (DCI), wherein the DCI indicates an index of the first RV; and wherein determining the $i^{th}$ slot in the PUSCH resource based on m allocated for sending bits in the first RV comprises:

determining the $i^{th}$ slot in the PUSCH resource based on the index of the first RV and m allocated for sending bits in the first RV.

4. The method of claim 1, wherein the method further comprises:

receiving a PUSCH parameter from a network device, wherein the PUSCH parameter indicates a number of repetitions; and determining the PUSCH resource based on the number of repetitions.

5. The method of claim 1, wherein the method further comprises:

sending the first bit in the first RV on a remaining resource on a first symbol in the first slot when the last bit in the first RV is sent on the first symbol in the first slot; and sending the first bit in the first RV on a second symbol in the first slot when there is no remaining resource on the first symbol in the first slot, wherein the second symbol is a symbol next to the first symbol.

6. The method of claim 1, wherein the method further comprises:

determining N2 slots based on the PUSCH resource, wherein the N2 slots are allocated for the terminal device to send a second RV of the PUSCH, and N2 is an integer greater than 1.

7. An apparatus, comprising:

at least one processor; and a non-transitory memory coupled to the at least one processor and configured to store programming instructions that, when executed by the at least one processor, cause the apparatus to:

determine N1 slots based on a physical uplink shared channel (PUSCH) resource, wherein the N1 slots are allocated for a terminal device to send a first redundancy version (RV) of a PUSCH, and N1 is an integer greater than 1;

send an initial bit in the first RV on a second slot when a last bit in the first RV is sent on a last bit of a first slot, wherein the first slot is a $(n1)^{th}$ slot in the N1 slots, the second slot is a $(n1+1)^{th}$ slot in the N1 slots, and n1=1, 2, . . . , or N1−1; and continuously send bits in the first RV when a last bit sent on the first slot is not the last bit in the first RV, wherein the last bit transmitted on the first slot and the first bit transmitted on the second slot are two adjacent bits in the first RV, and the last bit transmitted on the first slot is the bit in the first RV preceding the first bit transmitted on the second slot.

8. The apparatus of claim 7, wherein the programming instructions that, when executed by the at least one processor, cause the apparatus to:

determine the $i^{th}$ slot in the PUSCH resource based on m allocated for sending bits in the first RV, wherein $$m = \left\lfloor \frac{p}{N_1} \right\rfloor \bmod 4,$$

p is an index or the $i^{th}$ slot, N1 is the number of slots allocated to send bits in the first RV, and i=1, 2, . . . , or N1−1.

9. The apparatus of claim 8, wherein the programming instructions that, when executed by the at least one processor, cause the apparatus to:

receive first downlink control information (DCI), wherein the DCI indicates an index of the first RV; and wherein determining the $i^{th}$ slot in the PUSCH resource based on m allocated for sending bits in the first RV comprises:

determining the $i^{th}$ slot in the PUSCH resource based on the index of the first RV and m allocated for sending bits in the first RV.

10. The apparatus of claim 7, wherein the programming instructions that, when executed by the at least one processor, cause the apparatus to:

receive a PUSCH parameter from a network device, wherein the PUSCH parameter indicates a number of repetitions; and determine the PUSCH resource based on the number of repetitions.

11. The apparatus of claim 7, wherein the programming instructions that, when executed by the at least one processor, cause the apparatus to:

send the first bit in the first RV on a remaining resource on a first symbol in the first slot when the last bit in the first RV is sent on the first symbol in the first slot; and send the first bit in the first RV on a second symbol in the first slot when there is no remaining resource on the first symbol in the first slot, wherein the second symbol is a symbol next to the first symbol.

12. The apparatus of claim 7, wherein the programming instructions that, when executed by the at least one processor, cause the apparatus to:

determine N2 slots based on the PUSCH resource, wherein the N2 slots are allocated for the terminal device to send a second RV of the PUSCH, and N2 is an integer greater than 1.

13. An apparatus, comprising:

at least one processor; and a non-transitory memory coupled to the at least one processor and configured to store programming instructions that, when executed by the at least one processor, cause the apparatus to:

determine N1 slots based on a physical uplink shared channel (PUSCH) resource resource, wherein the N1 slots are allocated for a terminal to send a first redundancy version (RV) of a PUSCH, and N1 is an integer greater than 1;

receive bits in the first RV in the N1 slots;

receive an initial bit in the first RV on a second slot when a last bit in the first RV is sent on a last bit of a first slot, wherein the first slot is a $(n1)^{th}$ slot in the N1 slots, the second slot is a $(n1+1)^{th}$ slot in the N1 slots, and n1=1, 2, . . . , or N1−1; and continuously receive bits in the first RV when a last bit sent on the first slot is not the last bit in the first RV, wherein the last bit transmitted on the first slot and the first bit transmitted on the second slot are two adjacent bits in the first RV, and the last bit transmitted on the first slot is the bit in the first RV preceding the first bit transmitted on the second slot.

14. The apparatus network device of claim 13, wherein the programming instructions that, when executed by the at least one processor, cause the apparatus to:

determine the PUSCH resource based on a number of repetitions.

15. The apparatus network device of claim 13, wherein the programming instructions that, when executed by the at least one processor, cause the apparatus to:

receive the first bit in the first RV on a remaining resource on a first symbol in the first slot when the last bit in the first RV is sent on the first symbol in the first slot.

16. The apparatus of claim 13, wherein the programming instructions that, when executed by the at least one processor, cause the apparatus to:

determine N2 slots based on the PUSCH resource, wherein the N2 slots are allocated for a terminal device to send a second RV of the PUSCH, and N2 is an integer greater than 1; and receive bits in the second RV in the N2 slots.

17. A data transmission method, performed by a network device or performed by a chip located outside or inside the network device, comprising:

determining N1 slots based on a physical uplink shared channel (PUSCH) resource, wherein the N1 slots are allocated for a terminal to send a first redundancy version (RV) of a PUSCH, and N1 is an integer greater than 1;

receiving bits in the first RV in the N1 slots;

receiving an initial bit in the first RV on a second slot when a last bit in the first RV is sent on a last bit of a first slot, wherein the first slot is a $(n1)^{th}$ slot in the N1 slots, the second slot is a $(n1+1)^{th}$ slot in the N1 slots, and n1=1, 2, . . . , or N1−1; and continuously receiving bits in the first RV when a last bit sent on the first slot is not the last bit in the first RV, wherein the last bit transmitted on the first slot and the first bit transmitted on the second slot are two adjacent bits in the first RV, and the last bit transmitted on the first slot is the bit in the first RV preceding the first bit transmitted on the second slot.

18. The method of claim 17, wherein the method further comprising:

determining the PUSCH resource based on a number of repetitions.

19. The method of claim 17, the method further comprising:

receiving the first bit in the first RV on a remaining resource on a first symbol in the first slot when the last bit in the first RV is sent on the first symbol in the first slot.

20. The method of claim 17, the method further comprising:

determining N2 slots based on the PUSCH resource, wherein the N2 slots are allocated for a terminal device to send a second RV of the PUSCH, and N2 is an integer greater than 1; and receiving bits in the second RV in the N2 slots.

21. The method of claim 1, wherein the N1 slots are inconsecutive resources in time domain.

22. The apparatus of claim 7, wherein the N1 slots are inconsecutive resources in time domain.

23. The apparatus of claim 13, wherein the N1 slots are inconsecutive resources in time domain.

24. The method of claim 17, wherein the N1 slots are inconsecutive resources in time domain.

* * * * *